United States Patent
Ikemoto

(10) Patent No.: US 9,964,085 B2
(45) Date of Patent: May 8, 2018

(54) FUEL INJECTION DEVICE

(71) Applicant: TOYOTA JIDOSHA KABUSHIKI KAISHA, Toyota-shi (JP)

(72) Inventor: Masato Ikemoto, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 8 days.

(21) Appl. No.: 14/780,936

(22) PCT Filed: Mar. 12, 2014

(86) PCT No.: PCT/JP2014/056512
§ 371 (c)(1),
(2) Date: Sep. 28, 2015

(87) PCT Pub. No.: WO2014/162832
PCT Pub. Date: Oct. 9, 2014

(65) Prior Publication Data
US 2016/0053732 A1 Feb. 25, 2016

(30) Foreign Application Priority Data

Apr. 3, 2013 (JP) .................................. 2013-078083

(51) Int. Cl.
*F02M 63/02* (2006.01)
*F02M 57/00* (2006.01)
(Continued)

(52) U.S. Cl.
CPC ......... *F02M 57/005* (2013.01); *F02D 35/023* (2013.01); *F02D 41/221* (2013.01);
(Continued)

(58) Field of Classification Search
CPC .. F02D 45/00; F02D 41/2467; F02D 41/0025; F02D 41/40; F02D 41/402; F02D 41/1497
(Continued)

(56) References Cited

U.S. PATENT DOCUMENTS

| | | | |
|---|---|---|---|
| 2009/0292447 A1 | 11/2009 | Yamaguchi et al. | |
| 2010/0094527 A1 | 4/2010 | Futonagane et al. | |
| 2012/0318053 A1* | 12/2012 | Ikemoto | ................ F02D 41/221 73/114.45 |

FOREIGN PATENT DOCUMENTS

| | | |
|---|---|---|
| JP | 2009-2229 A | 1/2009 |
| JP | 2009-281143 A | 12/2009 |

(Continued)

OTHER PUBLICATIONS

International Search Report dated Jun. 17, 2014 for PCT/JP2014/056512 filed on Mar. 12, 2014.

*Primary Examiner* — Joseph Dallo
*Assistant Examiner* — Kurt Liethen
(74) *Attorney, Agent, or Firm* — Oblon, McClelland, Maier & Neustadt, L.L.P.

(57) ABSTRACT

A fuel injection device including an injector that injects fuel into a cylinder of an engine; a fuel injection amount obtaining unit that obtains a fuel injection amount of fuel injected by the injector; a heat generation amount obtaining unit that obtains a heat generation amount of the fuel injected by the injector and ignited; and a control unit that determines that injector abnormality occurs, when determining that a difference between a fuel injection amount obtained by the fuel injection amount obtaining unit and a reference fuel injection amount is within a predetermined range and that a heat generation amount obtained by the heat generation amount obtaining unit is greater than a reference heat generation amount corresponding to the reference fuel injection (Continued)

amount. Accordingly, whether or not injection hole corrosion occurs in the injector can be determined.

7 Claims, 23 Drawing Sheets

(51) Int. Cl.
    *F02D 41/22*           (2006.01)
    *F02D 35/02*           (2006.01)
    *F02D 41/40*           (2006.01)
    *F02D 41/12*           (2006.01)

(52) U.S. Cl.
    CPC .......... *F02D 35/025* (2013.01); *F02D 41/123* (2013.01); *F02D 41/403* (2013.01); *F02D 2041/224* (2013.01); *F02D 2200/0614* (2013.01); *F02M 63/0225* (2013.01); *Y02T 10/40* (2013.01)

(58) Field of Classification Search
    USPC ........................................................ 701/104
    See application file for complete search history.

(56) References Cited

FOREIGN PATENT DOCUMENTS

| | | |
|---|---|---|
| JP | 2010-048214 A | 3/2010 |
| JP | 2010-101245 A | 5/2010 |
| JP | 2010-196556 A | 9/2010 |
| JP | 2010-255462 A | 11/2010 |
| JP | 2011-117338 A | 6/2011 |

\* cited by examiner

CHANGE IN INJECTION CHARACTERISTIC
DEPENDING ON INJECTION HOLE CORROSION

LOW ROTATIONAL SPEED (EASY IGNITION CONDITION)

HIGH ROTATIONAL SPEED (DIFFICULT IGNITION CONDITION)

RELATIONSHIP BETWEEN IN-CYLINDER
PRESSURE AND INJECTION RATE

INFLUENCE OF IN-CYLINDER PRESSURE
ON INJECTION BEHAVIOR

FUEL INLET PRESSURE WAVEFORM

FUEL INJECTION DEVICE

TECHNICAL FIELD

The present invention is related to a fuel injection device.

BACKGROUND ART

Recently, there have been proposed various measures for sulfur (S) that may be included in fuel used by an engine. For example, Patent Document 1 proposes reducing an EGR (Exhaust Gas Recirculation) amount when $SO_3$ is greater than a permissible value in consideration of corrosion of a fuel injection valve (injector).

PRIOR ART DOCUMENT

Patent Document

[Patent Docuemnt 1] Japanese Unexamined Patent Application Publication No. 2010-255462

SUMMARY OF THE INVENTION

Problems to be Solved by the Invention

Meanwhile, acid component is condensed on an injector, in particular, at a nozzle front end portion provided with an injection hole, so that injection hole corrosion might occur. The occurrence of the injection hole corrosion might influence spray to generate smoke. Therefore, in a case where the injection hole corrosion occurs, some measures are required for the injection hole corrosion. To take measures for the injection hole corrosion, it is required to suitably determine the presence or absence of the injection hole corrosion.

Although the proposal of Patent Document 1 can supposedly suppress the further corrosion of the injector, it cannot be grasped that the abnormality actually occurs in the injector, specifically, it cannot be accurately grasped whether or not the injection hole corrosion occurs.

The present invention described herein has an object to suitably determine whether or not abnormality occurs in an injector and whether or not injection hole corrosion occurs in the injector.

Means for Solving the Problems

To achieve the object, a fuel injection device described in the present specification includes: an injector that injects fuel into a cylinder of an engine; a fuel injection amount obtaining unit that obtains a fuel injection amount of fuel injected by the injector; a heat generation amount obtaining unit that obtains a heat generation amount of the fuel injected by the injector and ignited; and a control unit that determines that injector abnormality occurs, when determining that a difference between a fuel injection amount obtained by the fuel injection amount obtaining unit and a reference fuel injection amount is within a predetermined range and that a heat generation amount obtained by the heat generation amount obtaining unit is greater than a reference heat generation amount corresponding to the reference fuel injection amount.

When the heat generation amount is different nevertheless the difference between the reference fuel injection amount and the fuel injection amount is within a predetermined range and the difference in the fuel injection amount is not recognized, some kind of the abnormality might occur in the fuel injection device. In particular, when the heat generation amount is large, the injector abnormality is determined. In the case of the injector abnormality, especially, in the case of the injection hole corrosion occurs or plating applied to the injection hole is peeled off, a change in the spray form causes the heat generation amount to increase, nevertheless the fuel injection amount is not changed. By grasping this phenomenon, the injector abnormality is determined. In the case where the injection hole corrosion occurs or the case where the plating applied to the injection hole is peeled off, an increase in the diameter of the nozzle hole outlet end weaken the spray penetration, which causes the combustion to occur around the center of the cylinder (combustion chamber). As a result, the heat generation amount is increased. Therefore, when the increase in the heat generation amount is observed, it can be determined that the injection hole corrosion occurs or that the plating is peeled off The control unit can determine whether or not the injector abnormality occurs by comparing a fuel injection amount of pilot injection with the reference fuel injection amount and by comparing a heat generation amount of the pilot injection with the reference heat generation amount. The heat generation amount of the pilot injection tends not to be influenced by a change in the in-cylinder environment therebefore and thereafter, it is thus possible to finely grasp the heat generation amount. The reference fuel injection amount in this case can be, for example, a fuel injection amount in performing the injection under the same condition as the pilot injection in a shipping state of the injector.

The control unit can determine whether or not the injector abnormality occurs by comparing a heating amount, of single-shot injection of the single-shot fuel injection performed in performing fuel cut control, with the reference heat generation amount. The single-shot fuel injection in performing the fuel cut control can be performed at the timing when the fuel injection is not performed therebefore and thereafter and is difficult to be influenced by the change in the in-cylinder environment, thereby finely grasping the heat generation amount. The reference fuel injection amount in this case can be, for example, a fuel injection amount in performing the injection under the same condition as the single-shot fuel injection in a shipping state of the injector.

The heat generation amount obtaining unit can obtain a heat generation amount of the ignited fuel based on an in-cylinder pressure. The in-cylinder pressure is correlated with the heat generation amount, thereby obtaining the heating generation amount of the fuel ignited on the basis of the in-cylinder pressure.

The heat generation amount obtaining unit can obtain a heat generation amount of the ignited fuel based on a pressure change in fuel introduced to the injector. The change in the in-cylinder pressure influences the operation of a needle valve provided in the injector, so that the pressure of the fuel introduced into the injector, that is, the fuel inlet pressure fluctuates. Thus, by referring to the fluctuation in the fuel inlet pressure, it is possible to grasp the heat generation amount.

Effects of the Invention

According to the fuel injection device disclosed in the specification, it is possible to suitably determine whether or not abnormality occurs in an injector and injection hole corrosion occurs in the injector.

MODES FOR CARRYING OUT THE INVENTION

Figure 1:
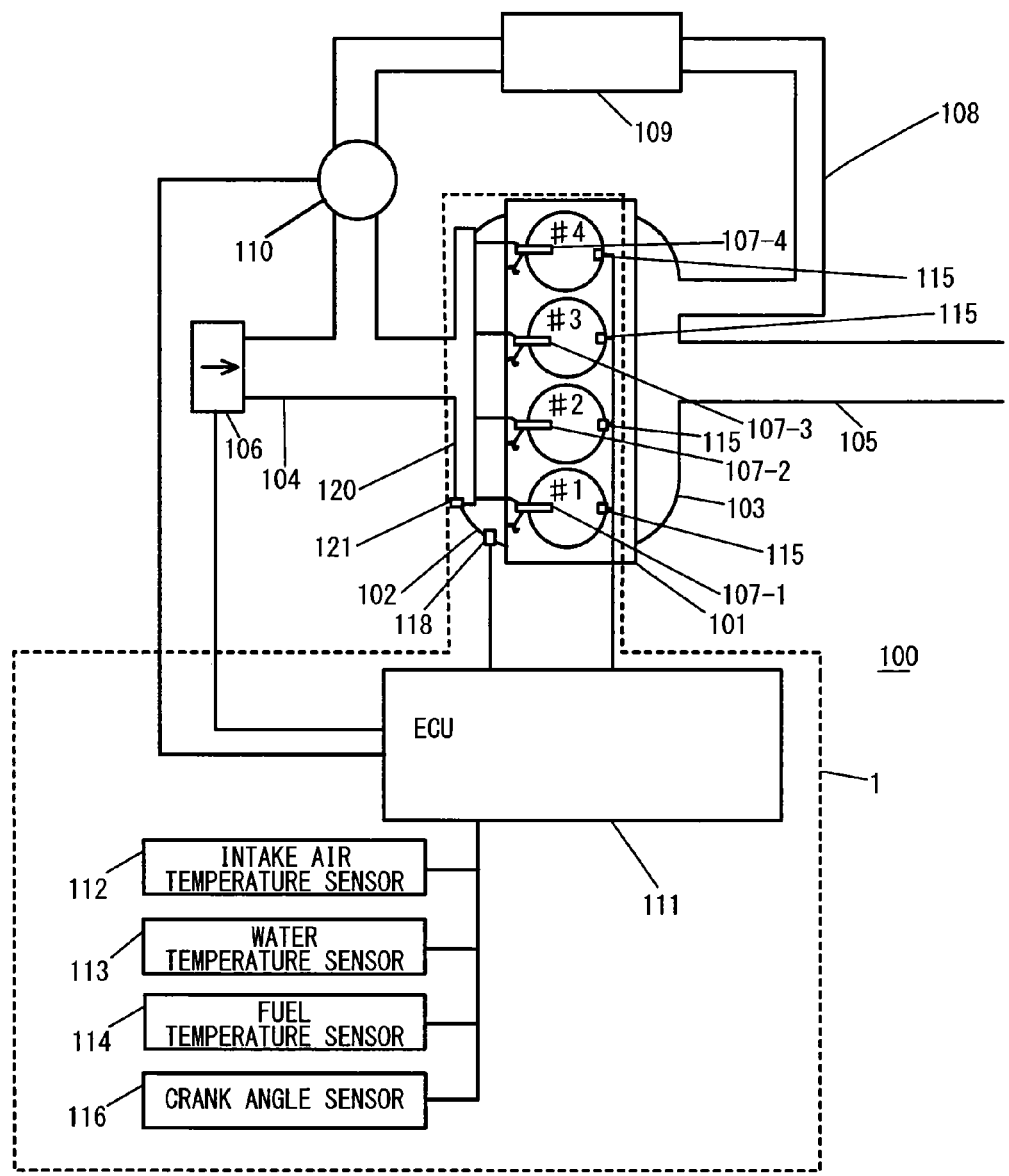
FIG. 1 is a schematic configuration view of an engine assembled with a fuel injection device according to a first embodiment.

An embodiment according to the present invention will be described with reference to the accompanying drawings. However, a dimension and a ratio of each component illustrated in the drawings may not correspond to the reality.

(First Embodiment)

FIG. 1 is a schematic configuration view of an engine 100 assembled with a fuel injection device 1 according to a first embodiment.

The engine 100 is an engine performing in-cylinder injection, more specifically, a diesel engine. The engine 100 has four cylinders. The engine 100 includes an engine body 101, and the engine body 101 includes #1 cylinder to #4 cylinder. The fuel injection device 1 is assembled into the engine 100. The fuel injection device 1 includes #1 injector 107-1 to #4 injector 107-4 corresponding to the #1 cylinder to the #4 cylinder. Specifically, the #1 cylinder is attached with the #1 injector 107-1, and the #2 cylinder is attached with the #2 injector 107-2. The #3 cylinder is attached with the #3 injector 107-3, and the #4 cylinder is attached with the #4 injector 107-4. The #1 injector 107-1 to the #4 injector 107-4 are connected to a common rail 120, and high-pressure fuel is supplied from the common rail 120. The common rail 120 is attached with a rail pressure sensor 121. The injection pressure of fuel is obtained by the rail pressure sensor 121.

The engine 100 includes an intake manifold 102 and an exhaust manifold 103 attached to the engine body 101. The intake manifold 102 is connected with an intake pipe 104. The exhaust manifold 103 is connected with an exhaust pipe 105 and with an end of an EGR passage 108. The other end of the EGR passage 108 is connected to the intake pipe 104. The EGR passage 108 is provided with an EGR cooler 109. In addition, the EGR passage 108 is provided with an EGR valve 110 for controlling the flow state of the exhaust gas. The intake pipe 104 is connected with an airflow meter 106. The airflow meter 106 is electrically connected to an ECU 111. The ECU 111 is electrically connected with the injectors 107-i (i indicates a cylinder number), specifically, the #1 injector 107-1 to the #4 injector 107-4. The ECU 111 can instruct the #1 injector 107-1 to the #4 injector 107-4 to individually inject fuel while the engine stops.

The ECU 111 is electrically connected with an intake air temperature sensor 112 for measuring an intake air temperature, a water temperature sensor 113 for measuring a temperature of coolant, and a fuel temperature sensor 114 for measuring a temperature of fuel. The #1 cylinder to the #4 cylinder provided in the engine 100 are respectively attached with in-cylinder pressure sensors (CPS; Combustion Pressure Sensor) 115 for measuring a combustion pressure, that is, an in-cylinder pressure. These in-cylinder pressure sensors 115 are electrically connected to the ECU 111. Furthermore, the ECU 111 is electrically connected with a crank angle sensor 116 for measuring a crank angle. The ECU 111 performs various control around the engine. Moreover, the rail pressure sensor 121 described above is also electrically connected to the ECU 111. The fuel injection device 1 includes an intake pressure sensor 118 disposed in the intake manifold 102. The intake pressure sensor 118 obtains an intake manifold pressure Pim.

The ECU 111 functions as a control unit. Also, the ECU 111 and the in-cylinder pressure sensor 115 are included in a heat generation amount obtaining unit that obtains a heat generation amount of the fuel injected by the injector 107 and ignited. Specifically, the ECU 111 obtains the heat generation amount of the fuel ignited within the cylinder (within a combustion chamber) based on the in-cylinder pressure measured by the in-cylinder pressure sensor 115. The in-cylinder pressure is correlated with the heat generation amount of the ignited fuel, and it is thus possible to grasp the heat generation amount by observing the in-cylinder pressure. Furthermore, the ECU 111 and the crank angle sensor 116 are included in the fuel injection amount obtaining unit that obtains the fuel injection amount injected by the injector 107. Specifically, by calculating torque equivalent amount corresponding to the rotational fluctuation measured by the crank angle sensor 116, it is possible to grasp the fuel injection amount injected.

Figure 2:
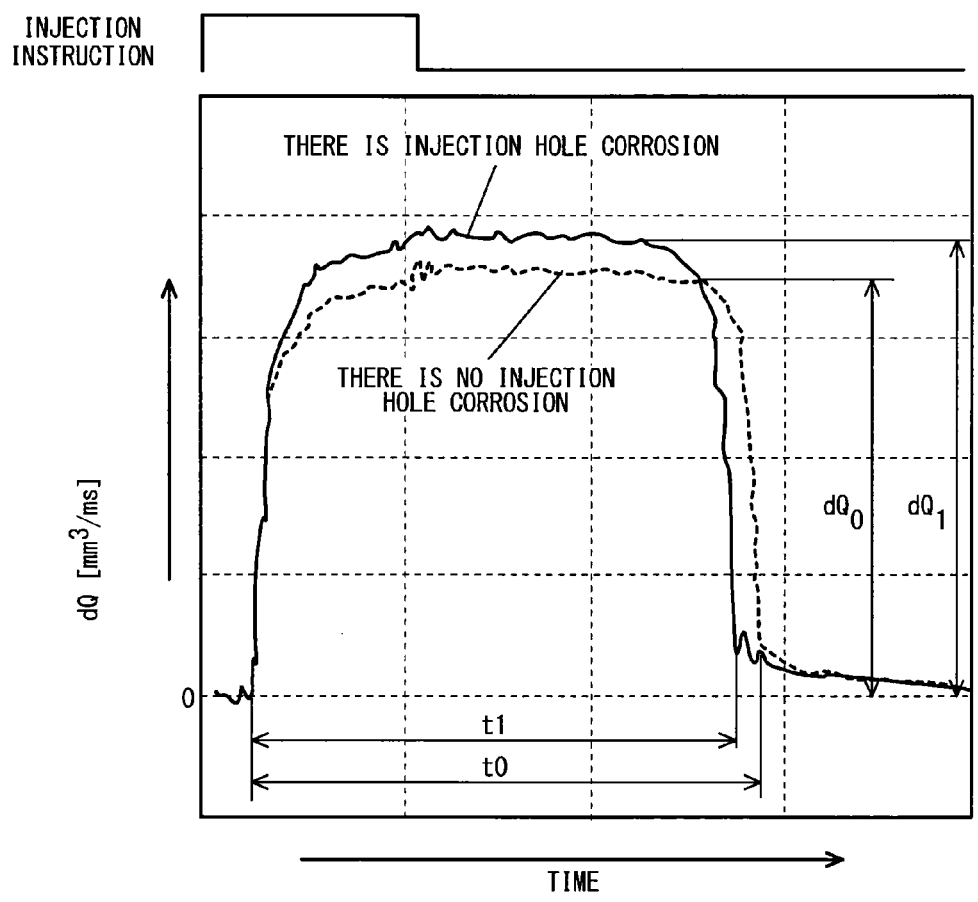
FIG. 2 is a graph illustrating a change in injection characteristic depending on injection hole corrosion in an injector.
Figure 3:
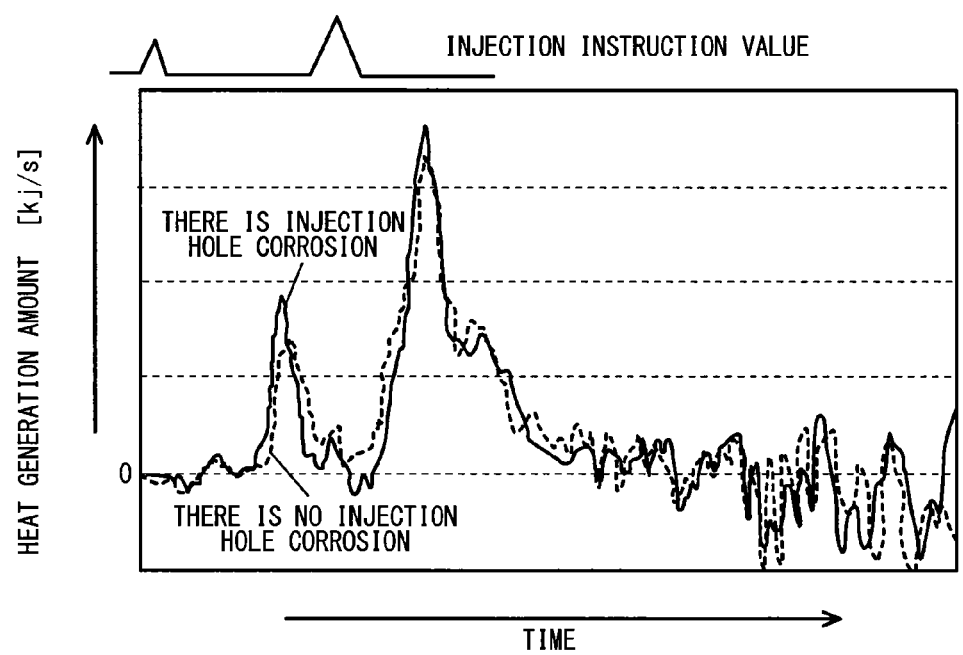
FIG. 3 is a graph illustrating a difference in heat generation amount depending on the presence or absence of the injection hole corrosion.

Hereinafter, although a description will be given of an example of control for the fuel injection device 1, a description will be given of a change in injection characteristic depending on injection hole corrosion with reference to FIG. 2 at first. Also, referring to FIG. 3, a description will be given of a difference in heat generation amount depending on the presence or absence of the injection hole corrosion. Referring to FIG. 2, a dashed line indicates the injection characteristic of the injector 107 in a state of the absence of the injection hole corrosion, and a solid line indicates the injection characteristic of the injector 107 in a state of the presence of the injection hole corrosion. Referring to FIG. 3, a dashed line indicates the heat generation amount by the injector 107 in the state of the absence of the injection hole corrosion, and a solid line indicates the heat generation amount by the injector 107 in the state of the presence of the injection hole corrosion. Hereinafter, referring to FIG. 2, a description will be given of the injection characteristic of the injector 107 having the injection hole corrosion and the injection characteristic of the injector 107 having on injection hole corrosion in comparison with each other. Herein, it is assumed that the injection instructions for both are the same. The maximum injection rate $dQ_1$ of the injector 107 having the injection hole corrosion is greater than the maximum injection rate $dQ_0$ of the injector 107 having no injection hole corrosion. In addition, the injection period t1 of the injector 107 having the injection hole corrosion is shorter than the injection period t0 the injector 107 having no injection hole corrosion. These phenomena are caused by an increase in the injection hole diameter due to the injection hole corrosion. The reason why the injection period becomes shorter is that an increase in the maximum injection rate $dQ$ immediately reduces the pressure acting as the force pushing up a needle valve provided in the injector 107 to increase the closing speed of the needle valve.

Additionally, the injected fuel injection amount itself does not change, the injection period is shortened by the increase in the maximum injection rate $dQ$ in the case of the presence of the injection hole corrosion, and the fuel injection amount to be injected at a time is the same as the case of the absence of the injection hole corrosion. Thus, in the case of the presence of the injection hole corrosion, the phenomenon of the increase in the maximum injection rate $dQ$ and the decrease in the injection period is observed under the condition that the injection instruction is the same as the case of the absence of the injection hole corrosion. Meanwhile, referring to FIG. 3, two peaks of the heat generation amount are seen. The former peak is due to the pilot injection, and the latter peak is due to the main injection. In any peak, the heat generation amount in the case of the presence of the injection hole corrosion is greater that the heat generation amount in the case of the absence of the injection hole corrosion. In the case of the presence of the injection hole corrosion, an increase in the diameter of the injection hole outlet end weakens the spray penetration to cause the combustion around the center of the cylinder (combustion chamber). As a result, the heat generation amount increases. The fuel injection device 1 according to the first embodiment observes the difference between these phenomena depending on the presence or absence of the injection hole corrosion, thereby determining the presence or absence of the injector abnormality. Additionally, in this specification, although the main cause of the injector abnormality is the injection hole corrosion, the determination of the fuel injection device 1 is not required to finally determine that there is injection hole corrosion. In short, it has only to be determined whether or not the abnormality occurs in the injector by grasping the phenomenon described above. Moreover, in this specification, the concept of the injection hole corrosion includes peeling off plating applied to an injection hole. Further, although the fuel injection device 1 according to this embodiment grasps that the fuel injection amounts are equal as described above, it is not practical to guarantee that the fuel injection amounts are completely identical.

Accordingly, in the embodiments disclosed in this specification, when the difference in the fuel injection amount is within a predetermined range, the fuel injection amounts can be treated to be identical.

Figure 4:
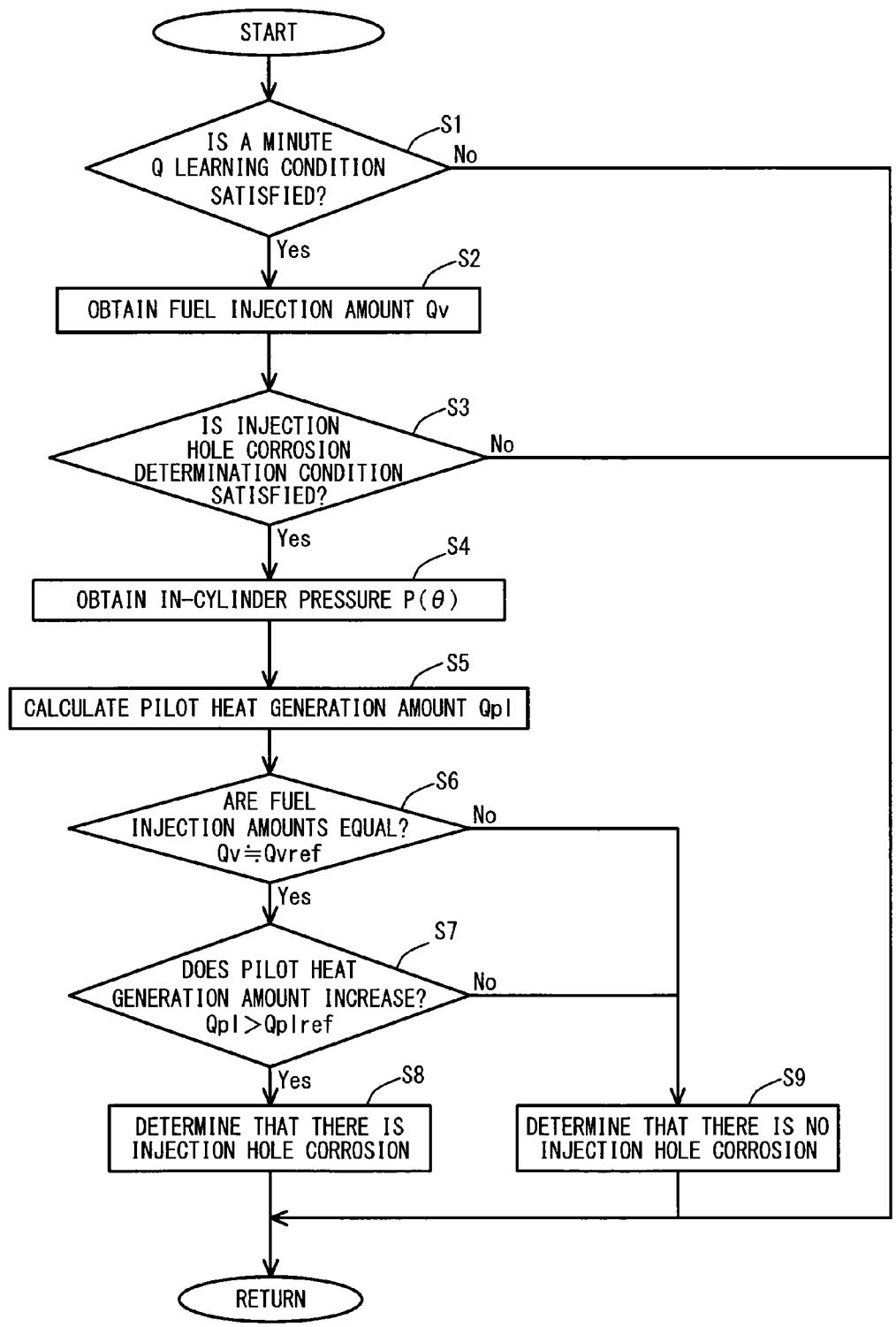
FIG. 4 is a flowchart illustrating an example of control for the fuel injection device according to the first embodiment.
Figure 5A:
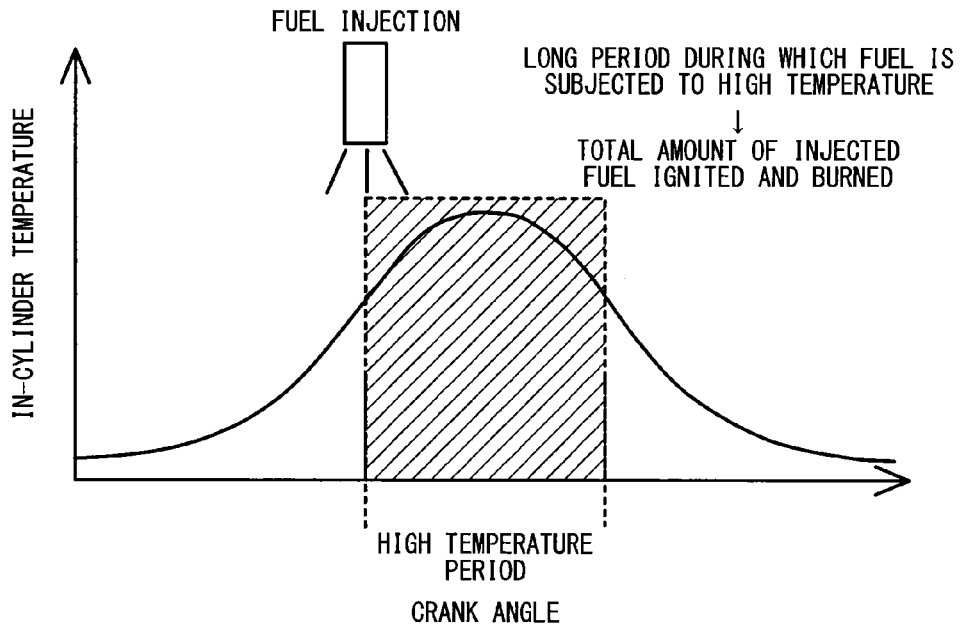
FIG. 5A is a graph illustrating a period in which an in-cylinder temperature is high at low rotational speed.
Figure 5B:
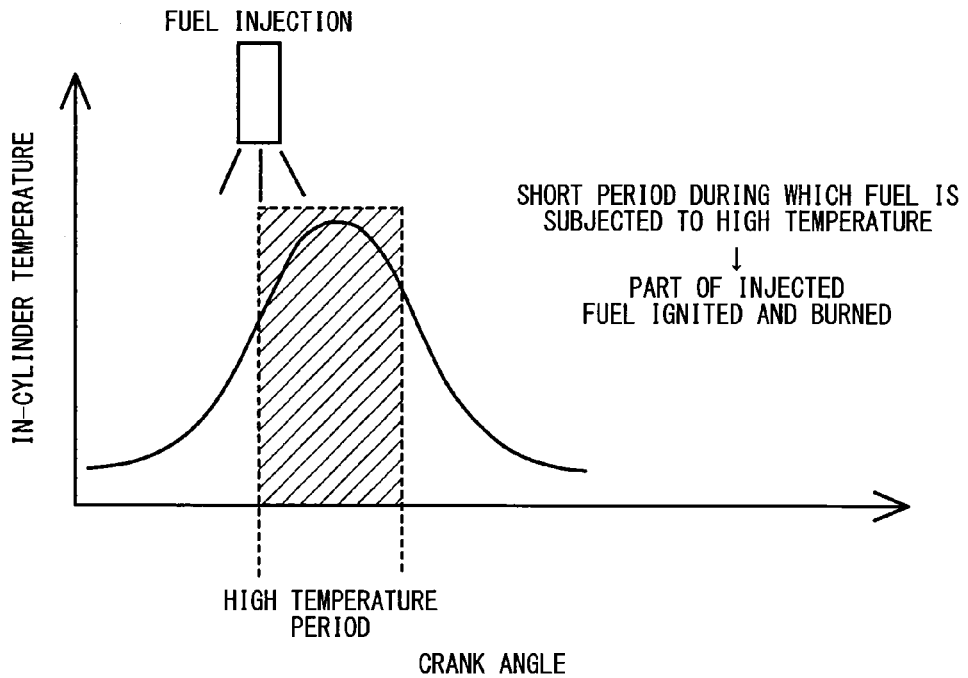
FIG. 5B is a graph illustrating a period in which the in-cylinder temperature is high at high rotational speed.

Referring to the flowchart illustrated in FIG. 4, it is determined whether or not a minute Q learning condition is satisfied in step Si at first. Herein, the minute Q learning condition is a condition for finely grasping the injected fuel injection amount, and, for example, it is required that the engine rotational speed is equal to or less than a predetermined rotational speed. Herein, referring to FIGS. 5A and 5B, the minute Q learning condition will be described. FIG. 5A illustrates a transition of the in-cylinder temperature at low rotational speed. A slight change in the crank angle at low rotational speed lengthens a high temperature period during which the in-cylinder is maintained at high temperature. That is, because of a long period during which the fuel is subjected to high temperature, the total amount of the injected fuel is ignited and burned. In contrast, FIG. 5B illustrates a transition of the in-cylinder temperature at high rotational speed. A drastic change in the crank angle at high rotational speed shortens the high temperature period during which the in-cylinder is maintained at high temperature. That is, because of a short period during which the fuel is subjected to high temperature, only a part of the injected fuel is ignited and burned. In a case of grasping the injected fuel injection amount as a torque equivalent amount obtained by the crank angle sensor, it is required that the total amount of the injected fuel is ignited and burned. Therefore, the minute Q learning condition is that the total amount of the injected fuel is ignited and burned at low rotational speed. Also, the minute Q learning condition includes when fuel cut control is being performed at the time of deceleration. When the fuel cut control is being performed, it is possible to inject the fuel for the purpose of evaluating the fuel injection amount, and it is convenient to grasp the fuel injection amount.

When No is determined in step S1, the processing returns. In contrast, when Yes is determined in step S1, the processing proceeds to step S2. In step S2, the fuel injection amount Qv [mm$^3$/st] is actually obtained. Specifically, the rotational fluctuation depending on the fuel injection is grasped by the crank angle sensor 116, and the fuel injection amount Qv [mm$^3$/st] is obtained based on its torque equivalent amount.

Figure 6:
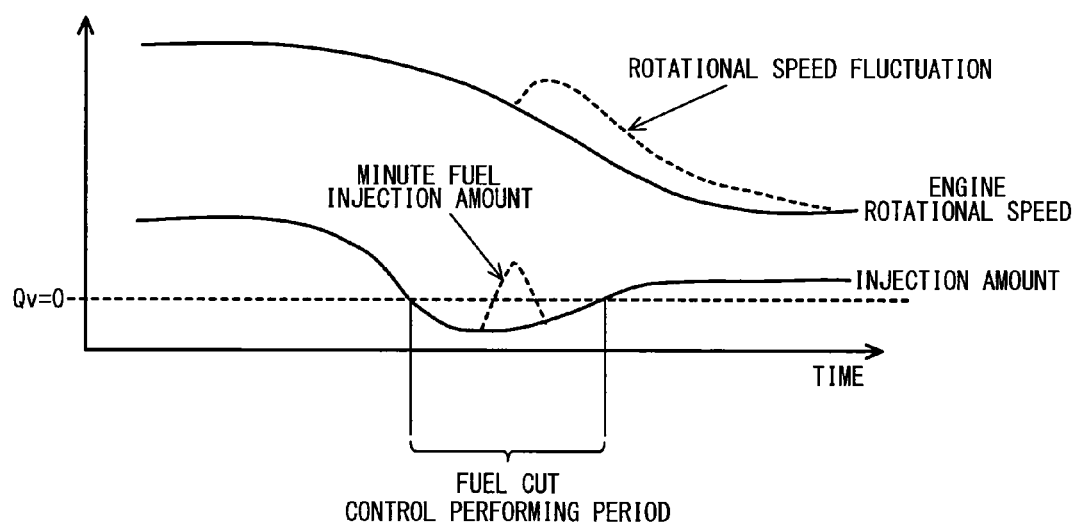
FIG. 6 is a graph illustrating an example of a relationship between a fuel injection amount and an engine rotational speed.

That is, as illustrated by a dotted line in FIG. 6, a small amount of fuel is injected during a period which the fuel cut control is performed. A small amount of fuel is injected in this way, so that the heat generated from the injected fuel causes the fluctuation in the engine rotational speed as illustrated by the dotted line in FIG. 6. This rotational speed fluctuation is detected by the crank angle sensor 116. The rotational speed fluctuation of the engine is grasped, thereby obtaining the fuel injection amount Qv [mm³/st] of the torque equivalent amount causing this rotational speed fluctuation. In order to determine the fuel injection amount Qv [mm³/st] based on a rotational speed fluctuation value, a map is used. Here, the injection instruction to inject a small amount of the fuel is set based on the following policy. That is, the injection instruction is set so as to inject the reference fuel injection amount Qvref compared in step S6 described later, when it is assumed that there is no injection hole corrosion.

Figure 7A:
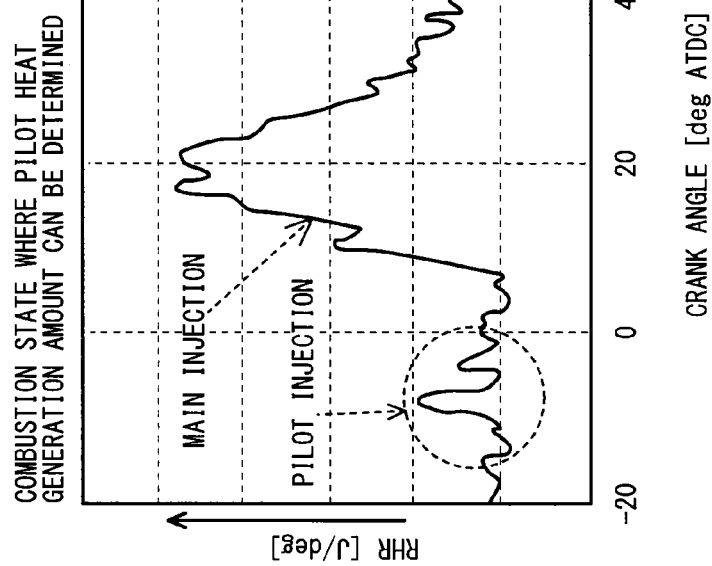
FIG. 7A is a graph illustrating an example of a combustion state where a pilot heat generation amount cannot be determined.
Figure 7B:
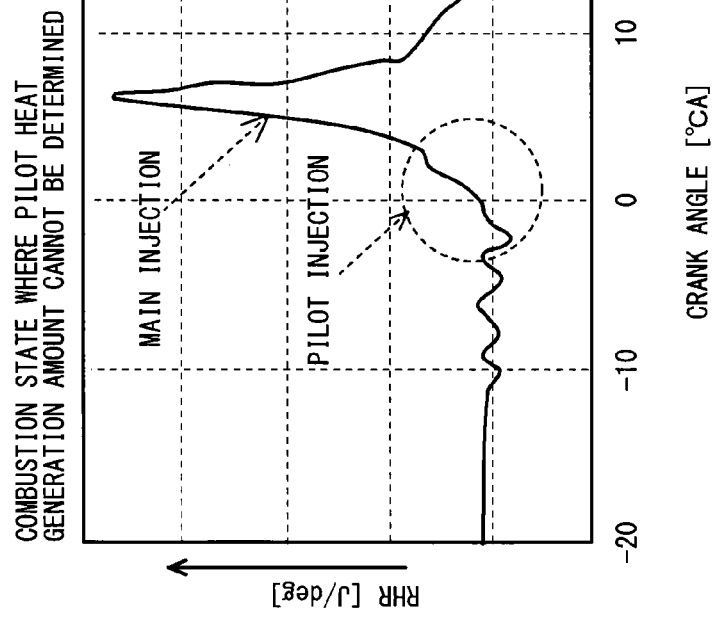
FIG. 7B is a graph illustrating an example of a combustion state where a pilot heat generation amount can be determined.

In step S3 carried out subsequently to step S2, it is determined whether or not the injection hole corrosion determination condition is satisfied. In the first embodiment, as will be described later, the ECU 111 compares the fuel injection amount of the pilot injection with the reference fuel injection amount and compares the heat generation amount of the pilot injection with the reference heat generation amount, thereby determining whether or not the injector abnormality occurs. Therefore, the injection hole corrosion determination condition can be set such that an intake pressure and an intake temperature are within respective specific ranges and such that fuel properties, specifically, a cetane number is within a predetermined range. The intake air temperature is obtained by the intake air temperature sensor 112, and the intake pressure is obtained by the intake pressure sensor 118. Conditions related to the intake air temperature and the intake air pressure are required for the following reason. Ignition and combustion in the pilot injection are caused by self ignition, and it is easier to ignite the fuel by itself as the pressure and the temperature at a place where the fuel is ignited are higher. That is, the ignition delay of the self ignition depends on the pressure and the temperature at the place where the fuel is ignited. Therefore, it is considered that information on temperature and pressure is needed to estimate the heat generation amount. As for the fuel property, for example, when no change in the small Q learning value is grasped by performing the small Q learning as described above before and after refueling, it can be determined that the fuel property is within the predetermined range. Also, it may be ensured that the fuel does not change by use of a fuel property sensor. Furthermore, in order to facilitate the calculation of the combustion period and the heat generation amount of the pilot injection, the injection hole corrosion determination condition may include a suitable condition under which the heat generation amount of the fuel injected by the pilot injection can be clearly calculated. FIG. 7A is a graph illustrating an example of the combustion state where the pilot heat generation amount cannot be determined, and FIG. 7B is a graph illustrating an example of the combustion state where the pilot heat generation amount can be determined. The injection hole corrosion determination in the first embodiment is performed at the timing when the peak of the pilot injection apparently occurs and at the timing when the peak of the main injection apparently occurs as illustrated in FIG. 7B. This makes it possible to suppress error determination.

Figure 8A:
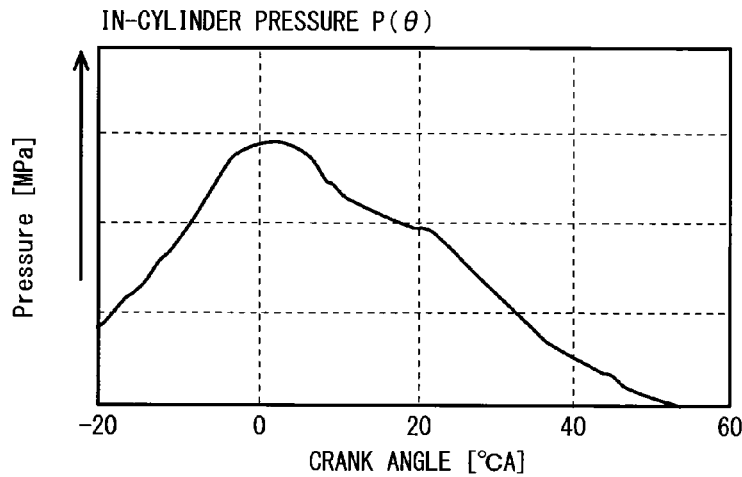
FIG. 8A is a graph illustrating an example of a change in an in-cylinder pressure.
Figure 8B:
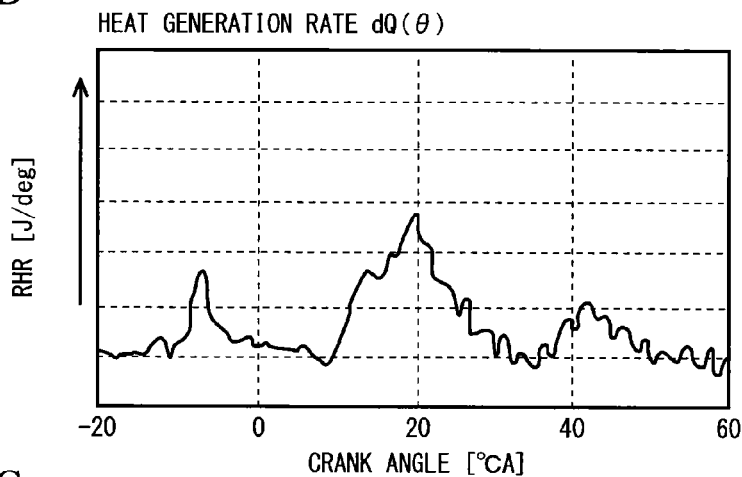
FIG. 8B is a graph illustrating an example of a change in a heat generation rate.
Figure 8C:
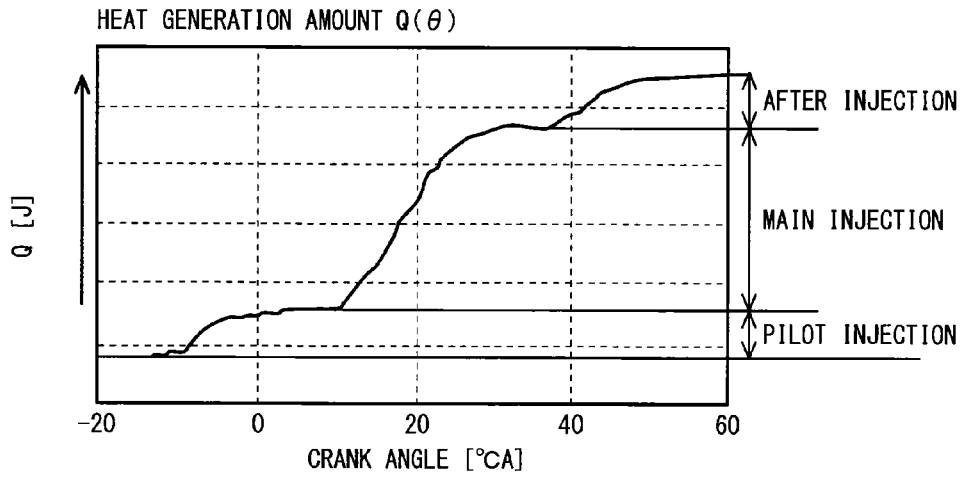
FIG. 8C is a graph illustrating an example of a change in a heat generation amount.

When No is determined in step S3, the processing returns. In contrast, when Yes is determined in step S3, the process proceeds to step S4. In step S4, the in-cylinder pressure P(θ) is obtained by the in-cylinder pressure sensor 115. Then, in step S5 carried out subsequently to step S4, on the basis of the history of the in-cylinder pressure P(θ) measured by the in-cylinder pressure sensor 115, the heat generation amount Q(θ) is calculated. FIG. 8A is a graph illustrating an example of a change in the in-cylinder pressure P(θ), FIG. 8B is a graph illustrating an example of a change in the heat generation rate dQ(θ), and FIG. 8C is a graph illustrating an example of a change in the heat generation amount Q(θ).

First, the heat generation rate dQ(θ) is calculated from the in-cylinder pressure P(θ) by Equation 1. In Equation 1, V(θ) indicates an in-cylinder volume at a given crank angle, and κ is a constant.

$$dQ(\theta) = (\kappa \cdot P(\theta) \cdot dV(\theta) + V(\theta) \cdot dP(\theta)/(\kappa-1)) \quad \text{Equation 1}$$

Then, the heat generation amount Q(θ) is calculated by integrating the heat generation rate dQ(θ) by equation 2.

$$Q(\theta) = Q(\theta - \Delta\theta) + dQ(\theta) \quad \text{Equation 2}$$

Next, the heat generation amount Qpl of the pilot injection is calculated. Here, the above-mentioned injection hole corrosion determination condition includes a condition under which the heat generation amount of the pilot injection and the main injection can be finely distinguished, thereby grasping the heat generation amount of the fuel injected by the pilot injection as illustrated in FIG. 8C. Thus, for example, the value Q(0) at the top dead center 0 degree CA can be the pilot heat generation amount Qpl. That is, Q(0)=Qpl can be formed. Incidentally, the combustion period of the pilot injection may be determined based on the heat generation rate dQ(θ) to directly calculate the heat generation amount.

In step S6 carried out subsequently to step S5, it is determined whether or not the fuel injection amount Qv obtained in step S2 is equal to the reference fuel injection amount Qvref. This confirms that the fuel injection amount is the same, and this ensures that the fuel injection amount of the pilot injection is suitable on the premise of the comparison between the pilot heat generation amount Qpl and a reference heat generation amount Qplref in step S7. The reference fuel injection amount Qvref, serving as the fuel injection amount in the state of the presence of the injection hole corrosion, can be compared with the fuel injection amount Qv [mm³/st] injected by minutely injecting the fuel during the fuel cut control. The first embodiment employs the fuel injection amount in a shipping state. Additionally, the determination that the fuel injection amounts are equal can include not only the described-above case of the exact same but also a case of a certain width in consideration of error and the like.

When Yes is determined in step S6, the process proceeds to step S7. In step S7, it is determined whether or not the pilot heat generation amount Qpl obtained in step S5 is greater than the reference heat generation amount Qplref. The reference heat generation amount Qplref is a heat generation amount corresponding to the reference fuel injection amount Qvref. The reference heat generation amount Qplref is the heat generation amount in the case where the reference fuel injection amount Qvref is injected under a condition equal to the condition included in the injection hole corrosion determination condition determined in step S3.

When Yes is determined in step S7, the process proceeds to step S8. In step S8, it is determined that there is the injection hole corrosion. Since it is determined that the heat generation amount of the fuel increases in a state where the fuel injection amount does not particularly change when the injection hole corrosion occurs, it concludes that the injector abnormality occurs, more specifically, it concludes that the injection hole corrosion occurs. Thus, the user can take measures such as replacement of the injector.

Either when No is determined in step S6 or when No is determined in step S7, the processing proceeds to step S9. In step S9, it is determined that there is no injection hole corrosion, and the processing returns. Further, when No is determined in step S6, it can be determined that some kind of abnormality occurs in the fuel injection device 1 at least. Therefore, when No is determined in step S6, it is also possible to turn on a warning light. The conceivable cause except for the generation of the injection hole corrosion is, for example, abrasion, sliding failure, jamming, and the like of the needle valve provided in the injector 107.

Thus, the fuel injection device 1 according to the first embodiment can suitably determine whether or not the abnormality occurs in the injector 107, more specifically, whether or not the injection hole corrosion occurs in the injector 107.

Additionally, the flowchart illustrated in FIG. 4 is an example, and the processing in each step can be appropriately replaced and carried out.

(Second Embodiment)

Figure 9:
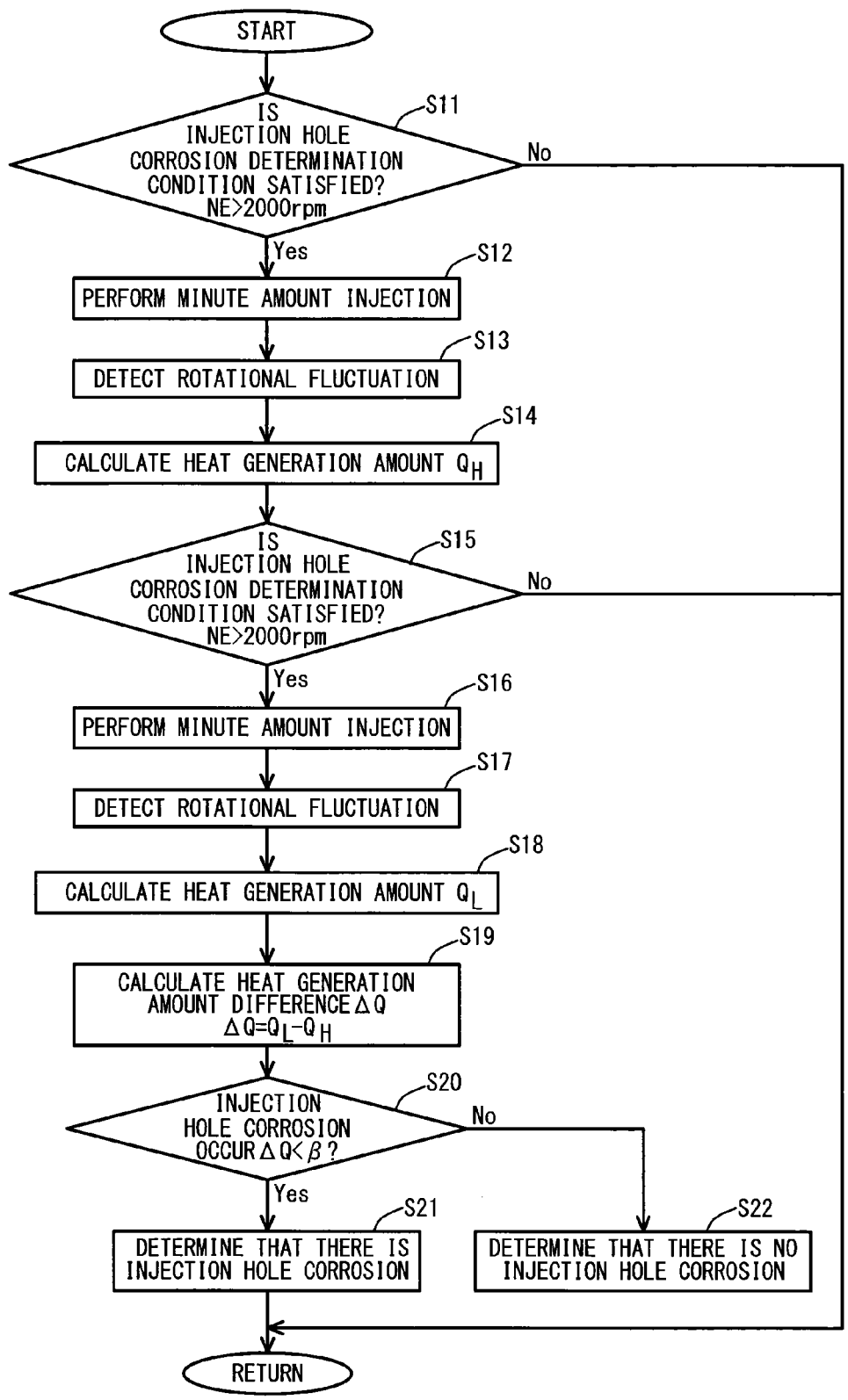
FIG. 9 is a flowchart illustrating an example of control for a fuel injection device according to a second embodiment.
Figure 10:
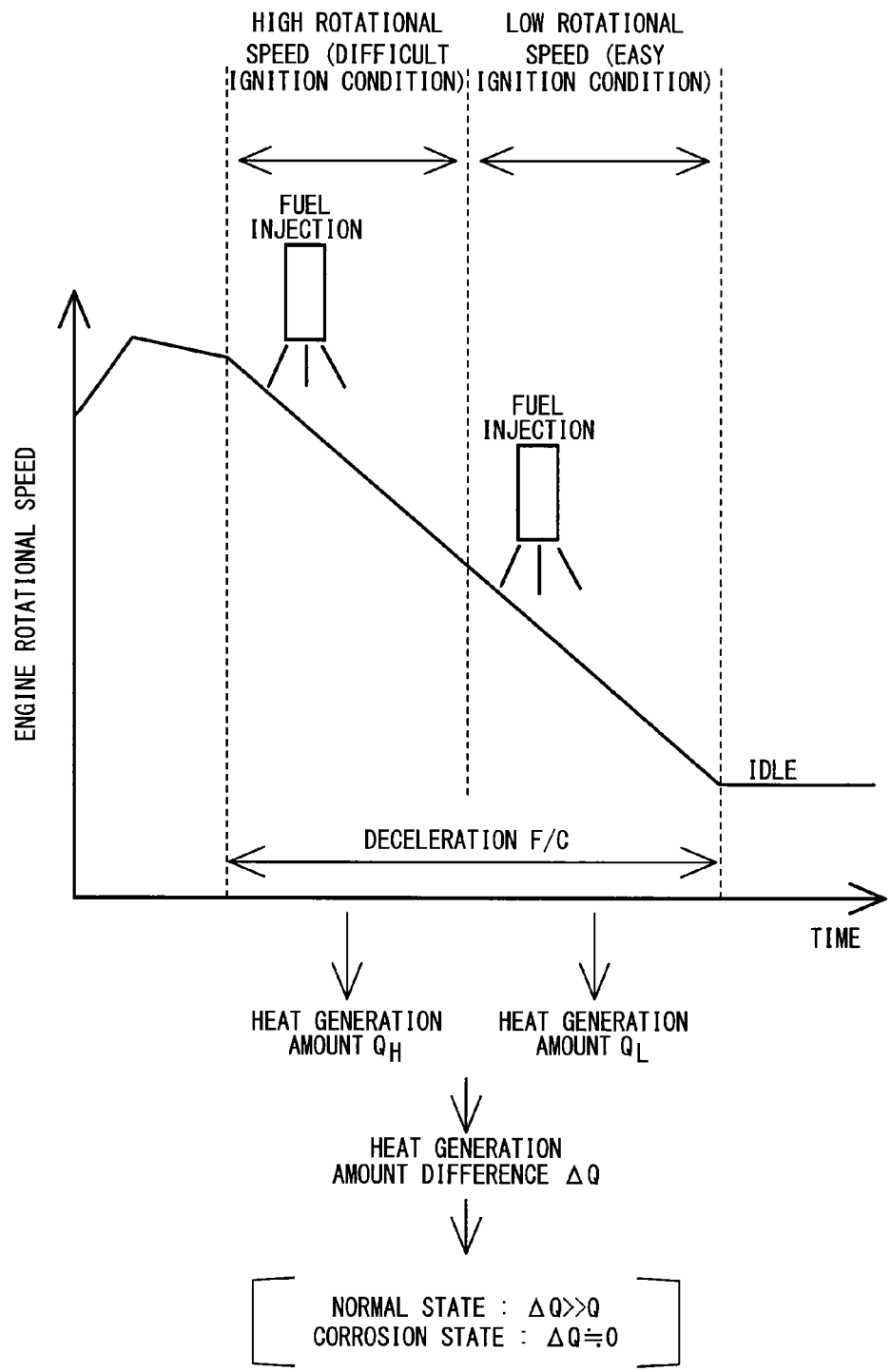
FIG. 10 is a graph illustrating a change in the engine rotational speed in fuel cut control.

Next, the second embodiment will be described with reference to FIG. 9 and FIG. 10. FIG. 9 is a flowchart illustrating an example of the control of a fuel injection device according to the second embodiment. Additionally, a schematic configuration of the fuel injection device 1 according to the second embodiment is common with the first embodiment, so its detailed description is omitted. However, in the second embodiment, the crank angle sensor 116 and the ECU 111 cooperatively function as a heat generation amount obtaining unit. Also, the ECU 111 functions as a fuel injection amount obtaining unit in the second embodiment. That is, the ECU 111 instructs to inject the preset reference fuel injection amount, when determining the presence or absence of the injection hole corrosion. Further, the second embodiment differs from the first embodiment in the following points. That is, the first embodiment determines the presence or absence of the injection hole corrosion on the basis of the pilot injection heat generation amount Qpl, whereas the second embodiment determines the presence or absence of the injection hole corrosion on the basis of the heat generation amount of the single-shot fuel injection in performing the fuel cut control.

First, in step S11, as for the injection hole corrosion determination condition, it is determines whether or not the engine rotational speed NE is higher than a preset predetermined rotational speed as a threshold value. In the present embodiment, 2000 rpm is set as an example of the threshold, it is thus determined whether or not the engine rotational speed NE is higher than 2000 rpm. Here, the condition under which the engine rotational speed NE is higher than 2000 rpm is intended to determine that the engine is in a high rotational speed state. Referring to FIG. 10, the state of the engine 100 gradually shifts to a low rotational speed state from the high rotational speed state, after the fuel cut control (deceleration F/C) starts. In the case of the high rotational speed, the fuel injected as described above is subjected to high temperature for a short period, so only a part of the injected fuel is ignited and burned (difficult ignition condition). In contrast, in the case of the low rotational speed, the injected fuel is subjected to high temperature for a long period, the total amount of the injected fuel is ignited and burned (easy ignition condition).

When No is determined in step S11, the processing returns. When Yes is determined in step S11, the process proceeds to step S12. In step S12, the minute amount injection is performed. At this time, the ECU 111 injects the preset reference fuel injection amount. In step S13 carried out subsequently to step S12, the rotational fluctuation is detected. Specifically, the rotational fluctuation is detected by the crank angle sensor 116. Then, in step S14, the heat generation amount Q. in the difficult ignition condition is calculated based on a value of the detected rotational fluctuation.

In step S15, as for the injection hole corrosion determination condition, it is determined whether or not the engine rotational speed NE is higher than 2000 rpm set as an example of a preset threshold as described above. That is, it is determined whether or not the easy ignition condition is satisfied. When No is determined in step S15, the processing returns. When Yes is determined in step S15, the processing proceeds to step S16. In step S16, the minute amount injection is performed. At this time, the ECU 111 injects the reference fuel injection amount which is preset. That is, the injection amount is the same as the fuel injection amount injected in step S12. In step S17 carried out subsequently to step S16, the rotational fluctuation is detected. Specifically, the rotational fluctuation is detected by the crank angle sensor 116. Then, in step S18, the heat generation amount $Q_L$ in the easy ignition condition is calculated based on a value of the detected rotational fluctuation. The heat generation amount $Q_L$ can be regarded as the reference heat generation amount corresponding to the reference fuel injection amount. In the easy ignition condition, the total amount of the injected fuel is ignited as described above. Therefore, it is conceivable that the heat generation amount $Q_L$ in the case where there is the injection hole corrosion is equal to the heat generation amount $Q_L$ in the case where there is no injection hole corrosion, so it serves as the reference heat generation amount corresponding to the reference fuel injection amount.

In step S19, a heat generation amount difference $\Delta Q = Q_L - Q_H$ is calculated. That is, the heat generation amount of the single-shot injection performed under the difficult ignition condition is compared with the reference heat generation amount. Here, as comparing $Q_L$ with $Q_H$, $Q_L$ is greater, because the total amount of the injected fuel is ignited and burned under the easy ignition condition.

In step S20, it is determined whether or not the heat generation amount difference $\Delta Q$ is smaller than a threshold value β. Herein, the threshold valuer β is difference in the heat generation amount between cases where the reference fuel injection amount is injected under the difficult ignition condition and under the easy ignition condition, in a state where it is assured that the injection hole corrosion does not occur in the injector 107 and that the abnormality does not occur.

In the case where the injection hole corrosion does not occur in the injector 107, the heat generation amount is small under the difficult ignition condition. For this reason, $\Delta Q$ becomes larger. In contrast, in the case where the injection hole corrosion occurs in the injector 107, the heat generation amount is large, because the injected fuel burns at the center of the cylinder. Therefore, $\Delta Q$ becomes smaller. Thus, by comparing $\Delta Q$ with the threshold value β, it is possible to grasp the change in the heat generation amount under the difficult ignition condition.

Therefore, when Yes is determined in step S20, the processing proceeds to step S21, then it is determined that there is the injection hole corrosion. Further, when No is determined in step S20, the processing proceeds to step S21, it is determined that there is no injection hole corrosion. After step S21 and step S22, any processing returns.

Through the above described processing, it is possible to suitably determine whether or not the abnormality occurs in the injector and to suitably determine whether or not the injection hole corrosion occurs in the injector. Additionally, in the second embodiment, by instructing the same amount of the fuel injection in step S12 and step S16, it is assured that the fuel injection amount under the difficult ignition condition is the same as the reference fuel injection amount. Alternatively, for example, on the basis of pressure fluctuation in the fuel introduced into the injector 107 detected by a pressure gauge 117 arranged in a fuel introduction path to be described later, the actual fuel injection amount may be grasped and compared.

(Third Embodiment)

Figure 11:
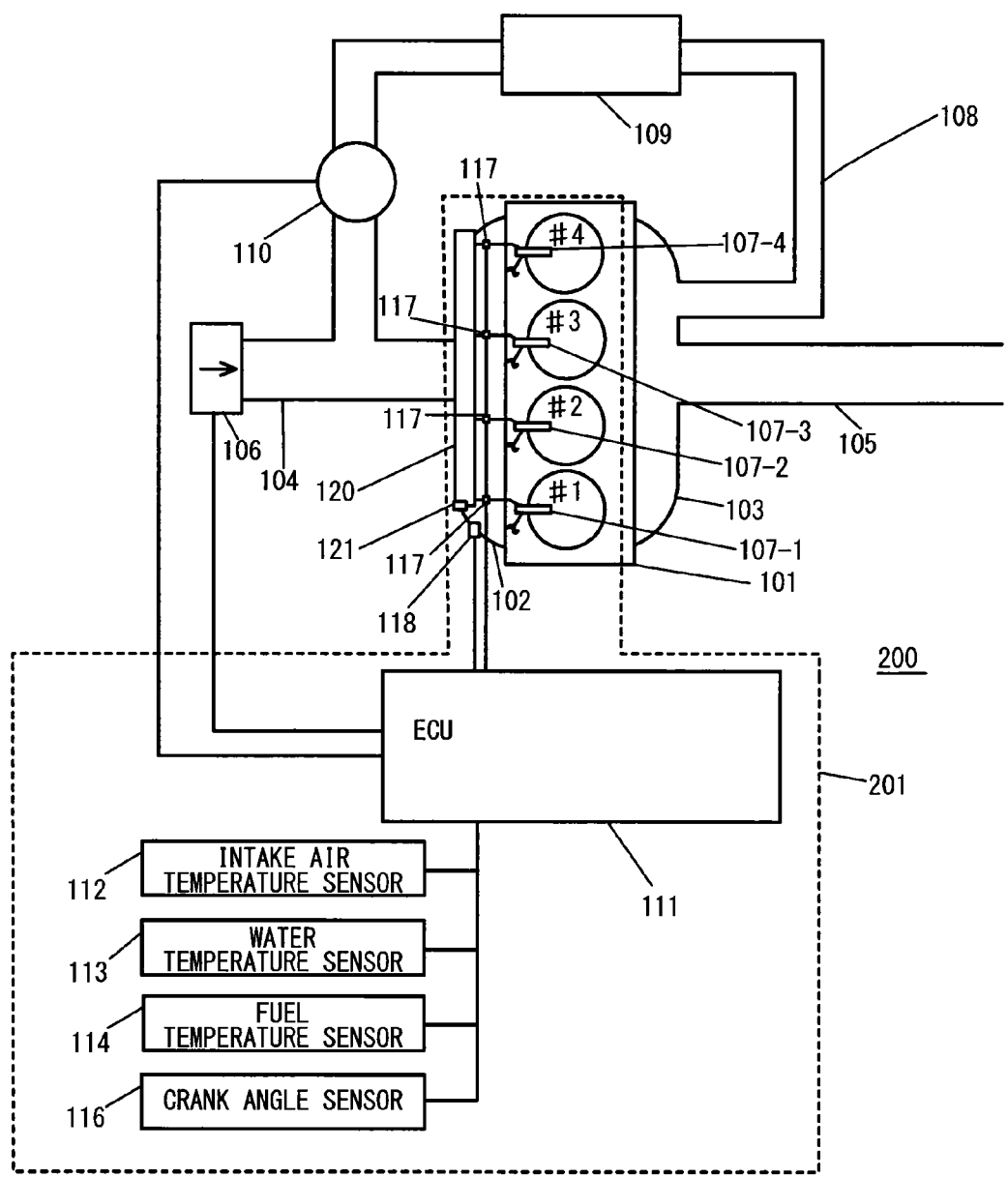
FIG. 11 is schematic configuration view illustrating an engine assembled with a fuel injection device according to a third embodiment.

Next, the third embodiment will be described with reference to FIGS. 11 to 17. FIG. 11 is an explanatory view illustrating a schematic configuration of an engine 200 assembled with a fuel injection device 201 according to the third embodiment. The fuel injection device 201 according to the third embodiment differs from the fuel injection device 1 according to the first embodiment in the following points. That is, the fuel injection device 201 is provided with the pressure gauge 117 arranged in the fuel introduction path for introducing the fuel to the injector 107, instead of the in-cylinder pressure sensor 115 provided in the fuel injection device 1. The pressure gauge 117 can detect the pressure fluctuation in the fuel that has been introduced into the injector 107. The ECU 111 obtains the heat generation amount of the ignited fuel on the basis of the pressure fluctuation obtained by the pressure gauge 117. Also, other components do not differ from those of the first embodiment, so common components are represented by the same reference numerals in the drawings, and detailed description thereof will be omitted.

Figure 12:
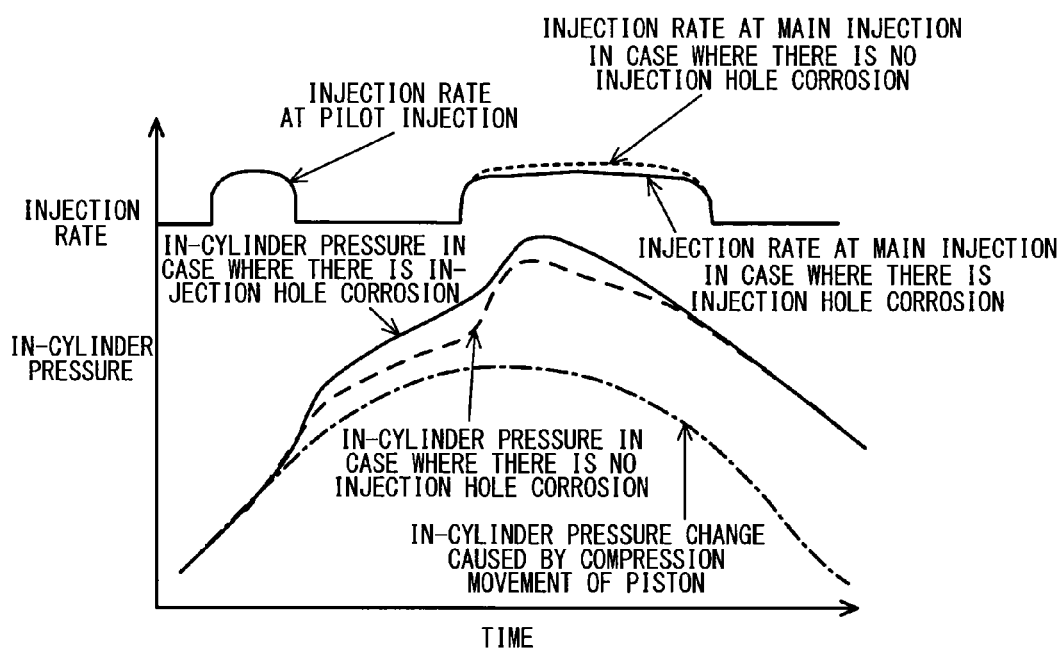
FIG. 12 is an example of a graph illustrating a change in the in-cylinder pressure in performing pilot injection and in performing main injection in comparison between the presence and the absence of the injection hole corrosion.
Figure 13:
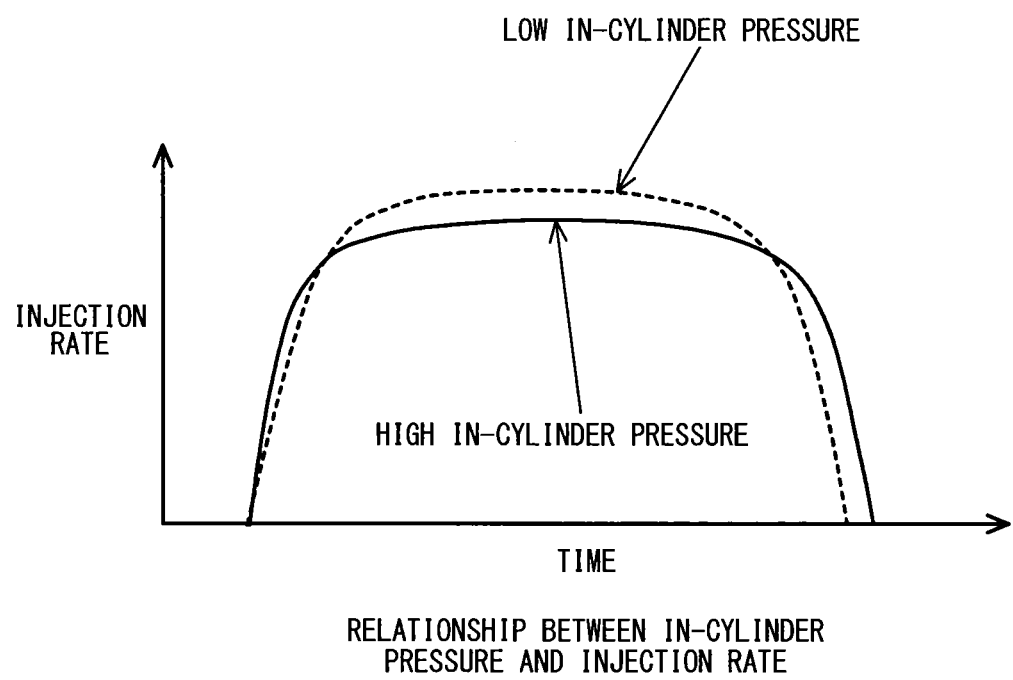
FIG. 13 is an example of a graph illustrating a relationship between the in-cylinder pressure and an injection rate.

FIG. 12 is an example of a graph illustrating a time change in the in-cylinder pressure in performing the pilot injection and in performing the main injection in comparison between the presence and the absence of the injection hole corrosion. FIG. 13 is an example of a graph illustrating a relationship between the in-cylinder pressure and an injection rate. Referring to FIG. 12, the in-cylinder pressure change is a sum value of an in-cylinder pressure change caused by the compression movement of the piston and an in-cylinder pressure change caused by the pilot injection and the main injection. Herein, a description will be given of a relationship between the in-cylinder pressure and the behavior of the needle valve provided in the injector 107. The in-cylinder pressure acts as the force for pushing up the needle valve from the inside of the cylinder and for exerting on the needle valve. Therefore, the high in-cylinder pressure increases the force exerting on the needle valve from the inside. The force exerting on the needle valve acts as assist force pushing up the needle valve at the time of opening the valve, whereas the force acts as force opposite to the closing force of the needle valve in closing the valve. Thus, the in-cylinder pressure increases the valve opening speed of the needle valve and decreases the valve closing speed.

Herein, a description will be given of an in-cylinder pressure change at the time of pilot injection. The in-cylinder pressure at the time of pilot injection is not influenced by the injection previously carried out. Therefore, the opening behavior of the valve needle at the time of pilot injection is substantially constant regardless of the presence or absence of the injection hole corrosion. However, the heat generation amount of the pilot injection in the case where there is the injection hole corrosion is greater than the heat generation amount of the pilot injection in the case where there is no injection hole corrosion. This is because, as described in the first embodiment, in the case where there is the injection hole corrosion, the diameter of the nozzle hole outlet end increases, so that the spray penetration becomes weak to be burned near the center of the cylinder (combustion chamber). For this reason, in the case where there is the injection hole corrosion, a change in the in-cylinder pressure caused by performing the pilot injection is great as compared with the case where there is no injection hole corrosion, so that the in-cylinder pressure becomes high in the case where there is the injection hole corrosion. Such an increase in the in-cylinder pressure caused by the pilot injection influences the behavior of the needle valve in the main injection to be performed subsequently to the pilot injection.

Next, the in-cylinder pressure change at the time of main injection will be noticed. As described above, by performing the pilot injection by the injector 107 having the injection hole corrosion, the in-cylinder pressure at the time of main injection is made high, as compared with the case where there is no injection hole corrosion. Therefore, as illustrated in FIG. 13, the valve opening speed of the needle in a case of the high in-cylinder pressure is high, as compared with a case of the low in-cylinder pressure. Moreover, the valve closing speed of the needle in the case of the high in-cylinder pressure is low, as compared with the case of the low in-cylinder pressure. Further, the maximum injection rate in the case of the high in-cylinder pressure is small, as compared with the case of the low in-cylinder pressure. Thus, the behavior of the needle valve at the time of main injection differs depending on whether the presence or absence of the injection hole corrosion. By analyzing such difference in the needle valve at the time of main injection, it is possible to estimate the heat generation amount of the pilot injection.

Figure 14:
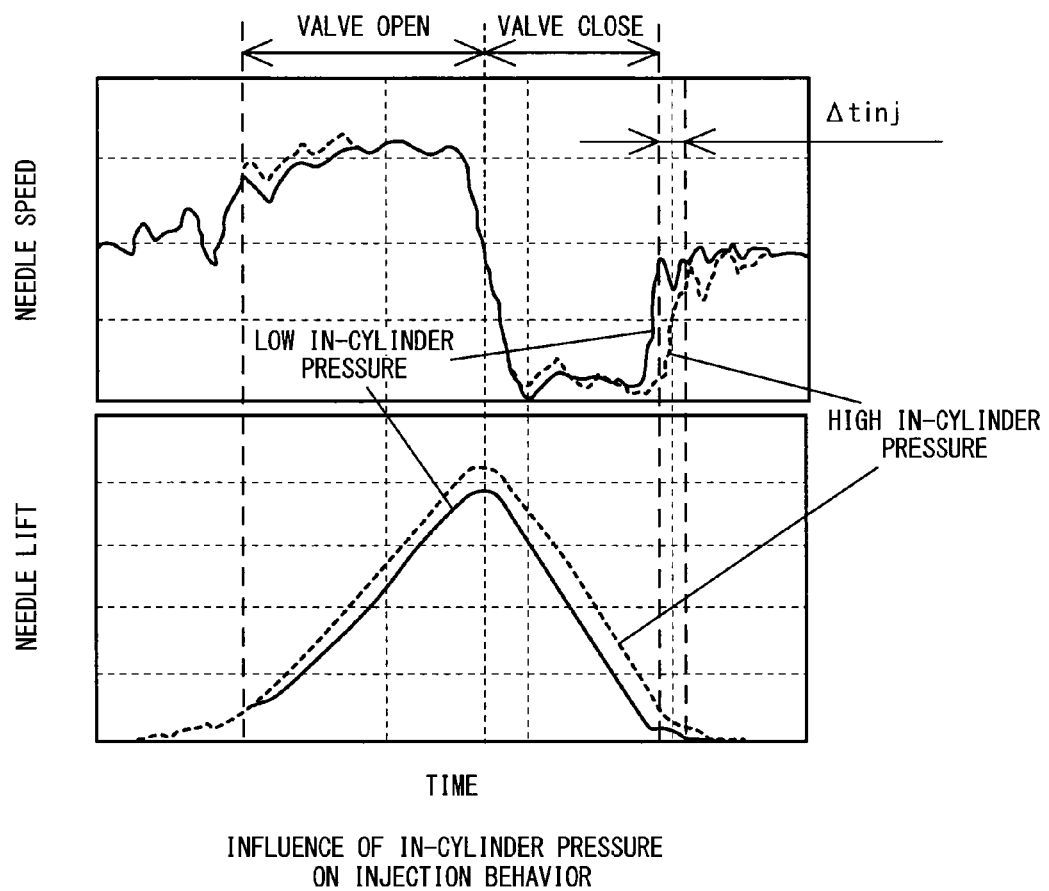
FIG. 14 is a graph illustrating an example of influence on injection behavior of the in-cylinder pressure (needle speed, needle lift amount, and an injection period)
Figure 15:
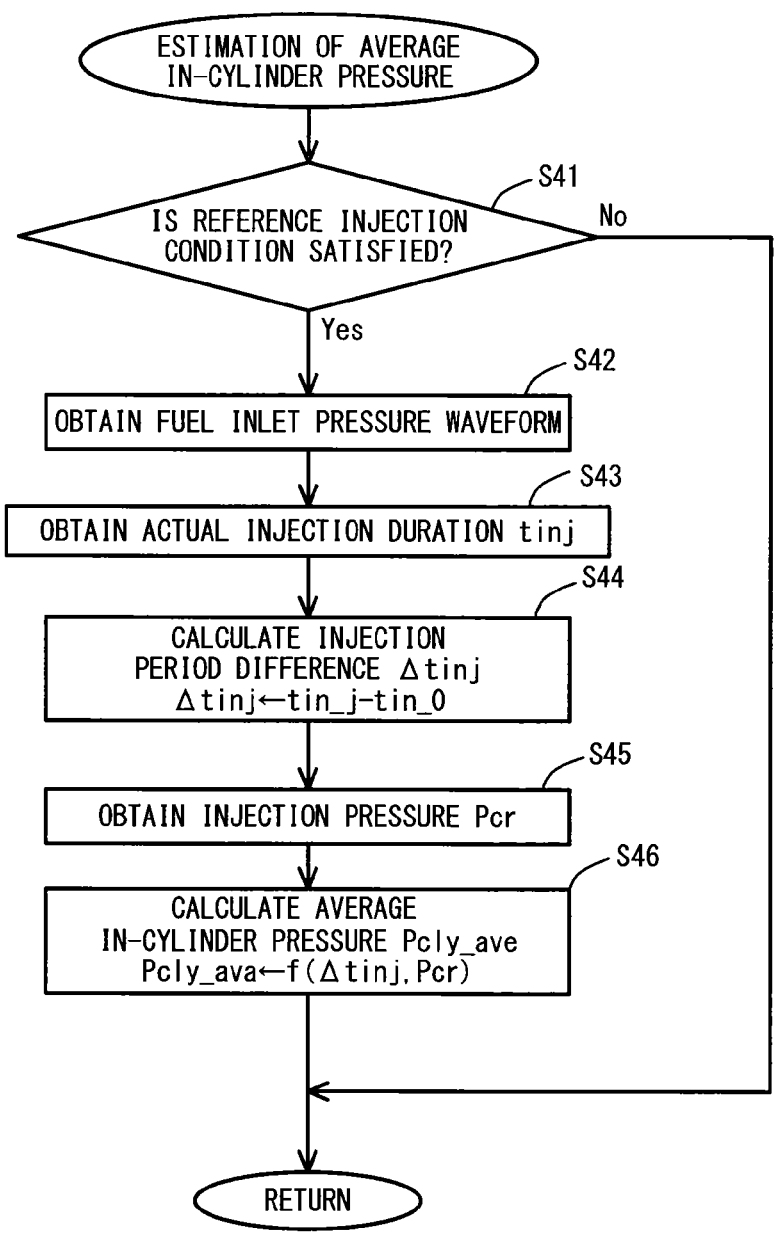
FIG. 15 is a flowchart illustrating an example of a method for calculating an average in-cylinder pressure.

Specifically, as analyzing the behavior of the needle valve with reference to FIG. 14, it can be seen that the needle speed, the needle lift amount, and the injection period tinj are different depending on the difference in the in-cylinder pressure. As described above, the in-cylinder pressure at the time of main injection becomes high, so that the force exerting on the needle valve provided in the injector 107 from the inside of the cylinder becomes strong. As a result, it can be seen that the needle lift amount of the main injection increases and that there is the difference in the injection period tinj. The movement of such a needle valve can be recognized as the pressure of the fuel introduced into the injector 107, that is, the fluctuation in the fuel inlet pressure. Therefore, by referring to the fluctuation in the fuel inlet pressure obtained by the pressure gauge 117, the heat generation amount is grasped. That is, in the third embodiment, the ECU 111 and the pressure gauge 117 function as a heat generation amount obtaining unit. By using the value obtained by the pressure gauge 117, it is possible to estimate the average in-cylinder pressure Pcly_ave. The average in-cylinder pressure Pcly_ave, instead of the cylinder internal pressure $P(\theta)$ in the first embodiment, can be used to evaluate the heat generation amount. Therefore, in the third embodiment, the control based on the flow diagram illustrated in FIG. 4 is basically performed, and the step based on the flow diagram illustrated in FIG. 15 is taken instead of the step S4 in FIG. 4. Specifically, when the injection is performed under the reference injection condition, the actual injection time period tinj_i is measured by the pressure gauge 117 and is compared to the reference injection duration tinj_0. Next, the average in-cylinder pressure Pcly_ave during the injection period is obtained. The following will describe the average in-cylinder pressure Pcly_ave.

First, in step S41, it is determined whether or not the reference injection condition is satisfied. Specifically, it is determined whether or not there is the state where the injection is performed at the reference injection pressure and by the reference injection amount required for the in-cylinder pressure estimation. Additionally, although it can be performed at the time of usual driving, that is, the time of the usual running as the driving state, the injection condition may be changed so as to facilitate the in-cylinder pressure estimation, for example, when some abnormality is detected. Specifically, the estimate of the average in-cylinder pressure Pcly_ave may be performed under the condition of the low injection pressure and the large injection amount. When No is determined in step S41, the processing returns.

Figure 16:
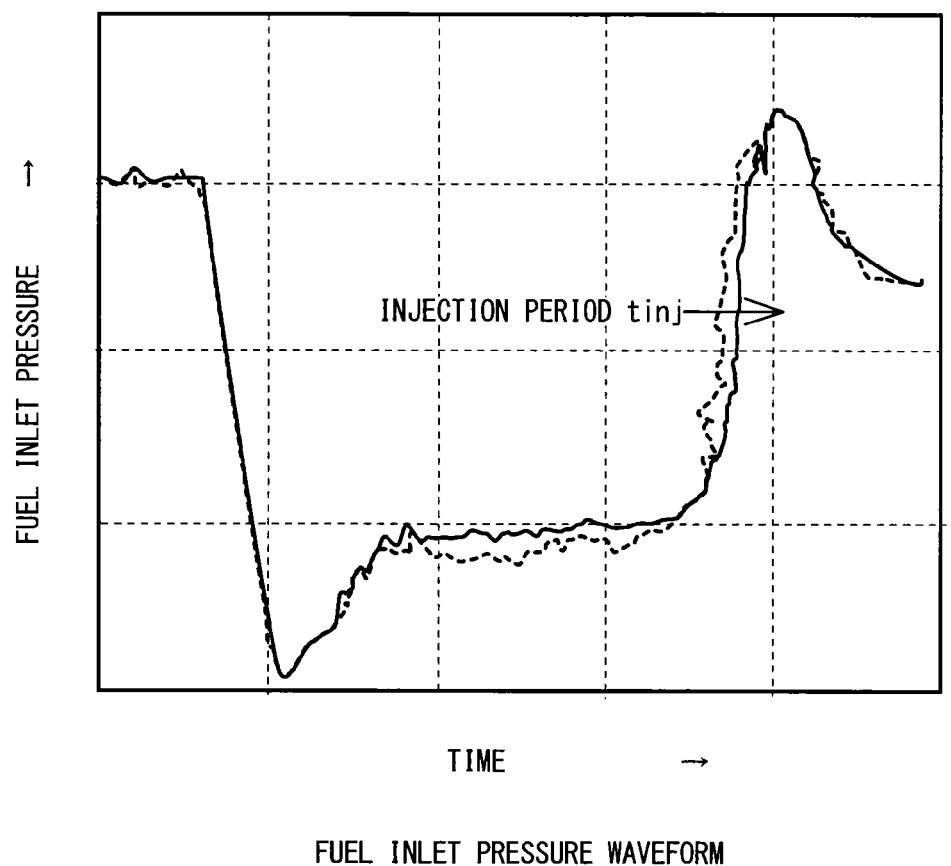
FIG. 16 is an explanatory view illustrating an example of a measurement result of a fuel inlet pressure waveform.

When Yes is determined in step S41, the processing proceeds to step S42. In step S42, the fuel inlet pressure waveform is obtained by the pressure gauge 117. FIG. 16 is an explanatory view illustrating an example of a measurement result of the fuel inlet pressure waveform. In step S43, by analyzing the waveform, the actual injection duration tinj_i is obtained.

In step S44, the injection period difference Δtinj is calculated. Specifically, equation 3 is calculated.

$$\Delta tinj=tinj\_i-tinj\_0 \quad \text{Equation 3}$$

Note that the subscript i indicates a measured value, and the subscript 0 indicates a reference value.

Figure 17:
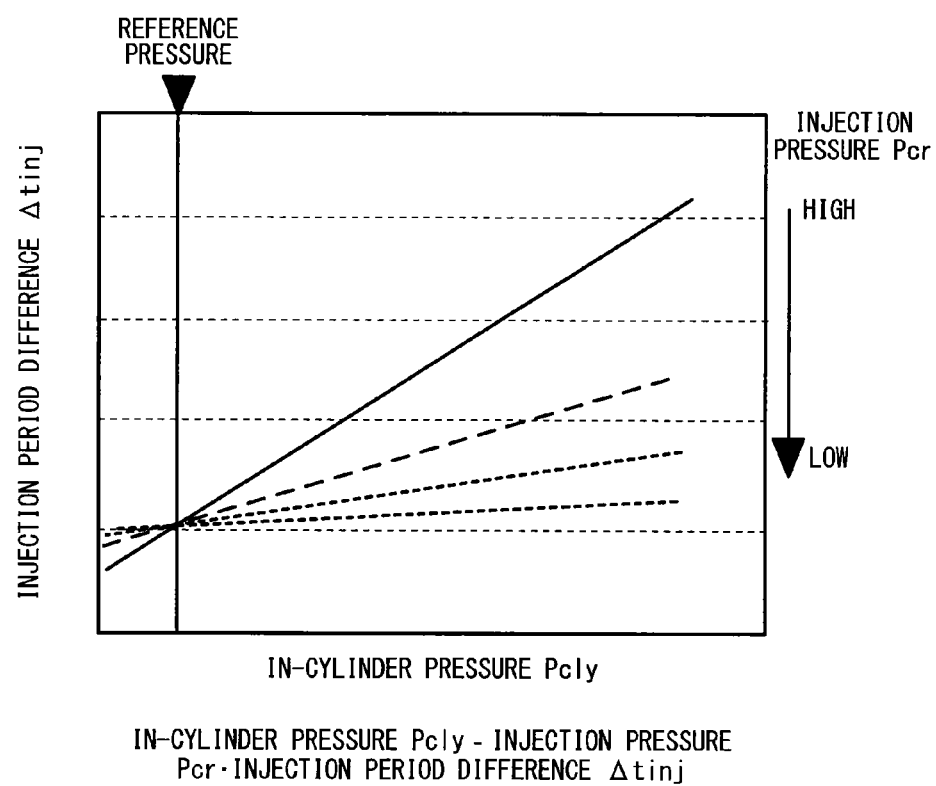
FIG. 17 is an example of a map that is referred in order to obtain the average in-cylinder pressure.
Figure 18:
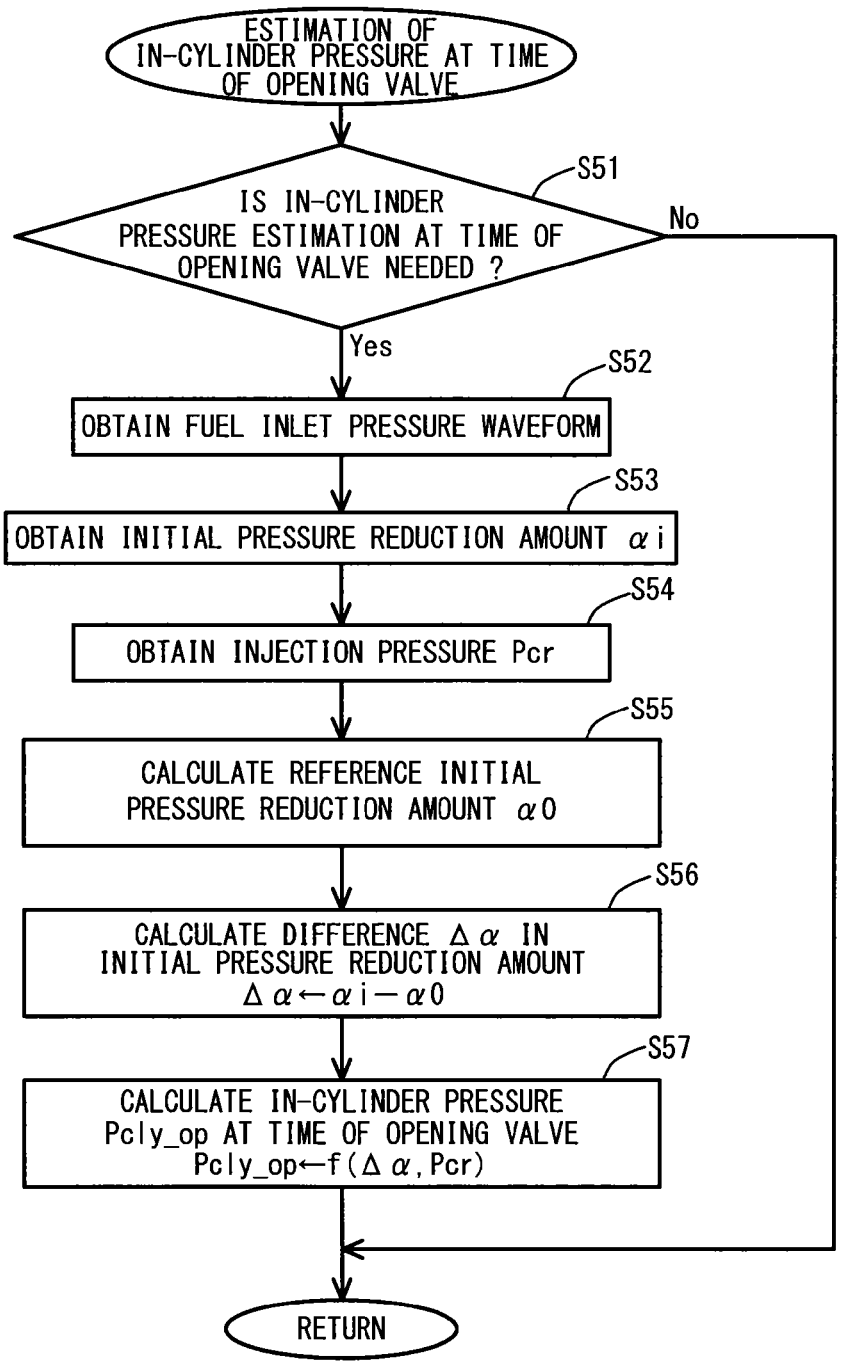
FIG. 18 is a flowchart illustrating an example of a method for calculating the in-cylinder pressure in opening a valve in a fourth embodiment.

In step S45, an injection pressure Pcr is obtained. The injection pressure Pcr is obtained as a measured value of the rail pressure sensor 121. In step S46, a map illustrated in FIG. 17 is referred, and the average in-cylinder pressure Pcly_ave is estimated. Referring to FIG. 17, the horizontal axis indicates the in-cylinder pressure Pcly, and the vertical axis indicates the injection period difference Δtinj. On the basis of such a map, first, a line to be referenced is selected depending on the value of the injection pressure Pcr. The inclination of the line increases and the line tends to be more easily influenced by the injection period difference Δtinj as the injection pressure Pcr decreases. After the line to be referenced is selected, the injection period difference Δtinj obtained in step S44 is applied thereto, so that the average in-cylinder pressure Pcly_ave can be calculated. That is, the in-cylinder pressure Pcly corresponding to the injection period difference Δtinj applied to the selected line is estimated as the average in-cylinder pressure Pcly_ave.

Instead of the in-cylinder pressure P(θ) illustrated in FIG. 4, the average in-cylinder pressure Pcly_ave calculated and estimated in the above way is employed and calculated, thereby calculate the pilot heat generation amount Qpl.

(Fourth Embodiment)

Next, the fourth embodiment will be described with reference to FIGS. 18 to 21. Like the third embodiment, the fourth embodiment employs the in-cylinder pressure Pcly_op at the time of opening the valve, instead of the in-cylinder pressure P(θ) in the first embodiment. The in-cylinder pressure Pcly_op is obtained by analyzing the fuel inlet pressure waveform obtained by the pressure gauge 117, like the third embodiment.

First, in step S51, it is determined whether or not the in-cylinder pressure estimation at the time of opening the valve is needed. Specifically, it is determine whether or not the timing for determining the abnormality due to learning of supercharger lag at the transient driving or deterioration in the supercharger arrives. When No is determined in step S51, the processing returns.

Figure 19:
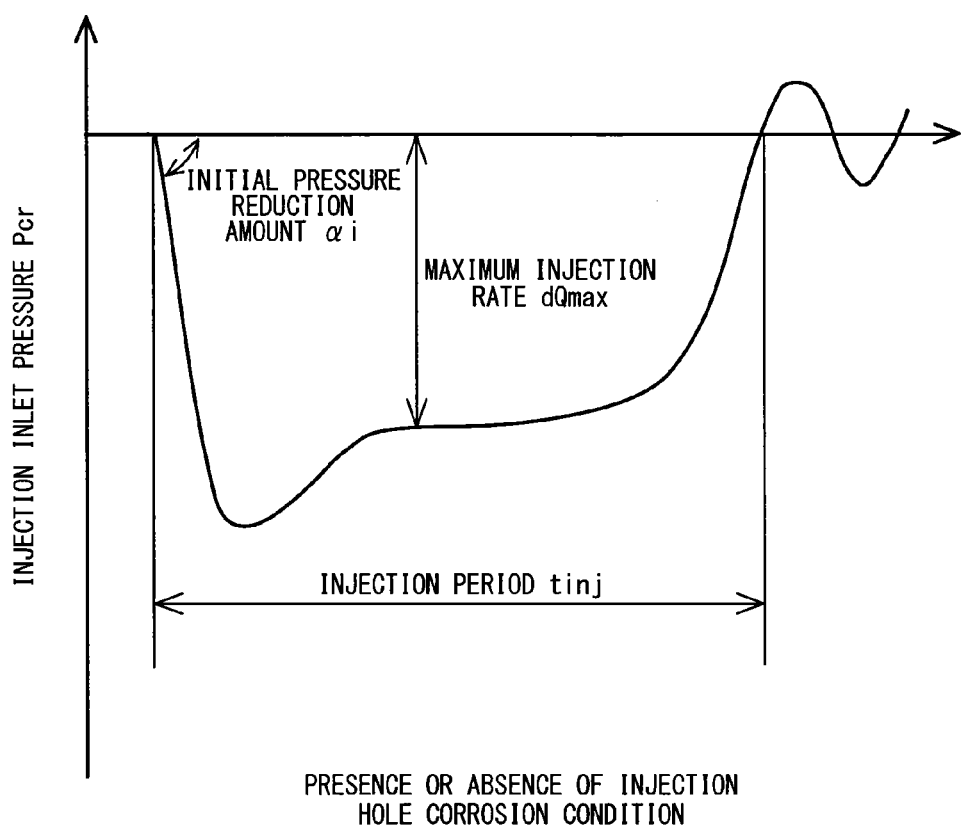
FIG. 19 is a graph illustrating an example of a change in the fuel inlet pressure.

When Yes is determined in step S51, the processing proceeds to step S52. In step S52, the fuel inlet pressure waveform is obtained by the pressure gauge 117. FIG. 16 is an explanatory view illustrating an example of a measurement result of the fuel inlet pressure waveform. In step S53, by analyzing the waveform, the initial pressure reduction amount a is obtained. FIG. 19 is a graph illustrating an example of a change in the fuel inlet pressure. Referring to this graph, it is possible to grasp an initial pressure reduction amount αi, a maximum injection rate dQmax, and an injection period tinj.

In step S54, an injection pressure Pcr is obtained. The injection pressure Pcr is obtained as the measured value of the rail pressure sensor 121. Then, in step S55, a reference initial pressure reduction amount α0 is calculated. The reference initial pressure reduction amount α0 is obtained based on one-dimensional map of the injection pressure Pcr obtained in step S54.

In step S56, a difference Δα in the initial pressure reduction amount is calculated. Specifically, equation 4 is carried out.

$$\Delta\alpha=\alpha i-\alpha 0 \quad \text{Equation 4}$$

Note that the subscript i indicates a measured value and the subscript 0 indicates a reference value.

Figure 20:
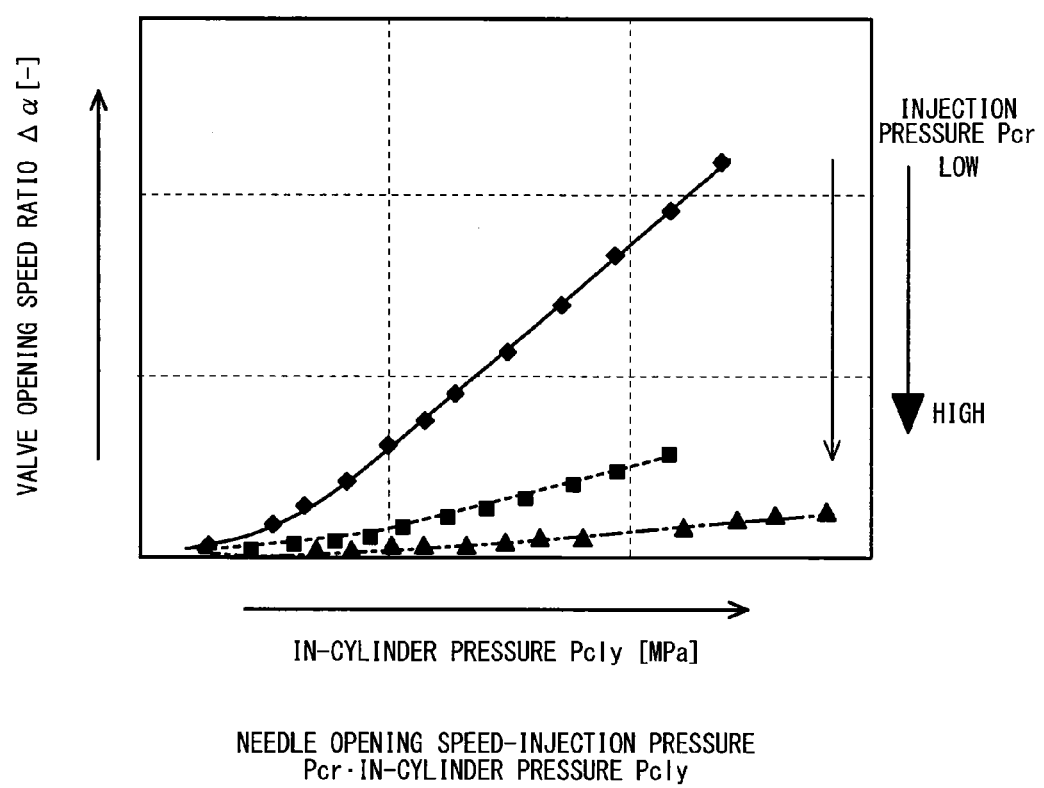
FIG. 20 is an example of a map referred for obtaining the in-cylinder pressure in opening the valve.

In step S57, the in-cylinder pressure Pcly_op at the time of opening the valve is calculated with reference to a map, illustrated in FIG. 20, to be referred for obtaining the in-cylinder pressure Pcly_op at the time of opening the valve. Referring to FIG. 20, first, on the basis of the value of the injection pressure Pcr, a line to be referenced is selected. The inclination of the line becomes larger and the line tends to be more easily influenced by the difference Δα in the initial pressure reduction amount, as the injection pressure Pcr becomes lower. After the line to be referenced is selected, the cylinder internal pressure Pcly_op can be calculated at the time of opening the valve by applying Δα.

Figure 21:
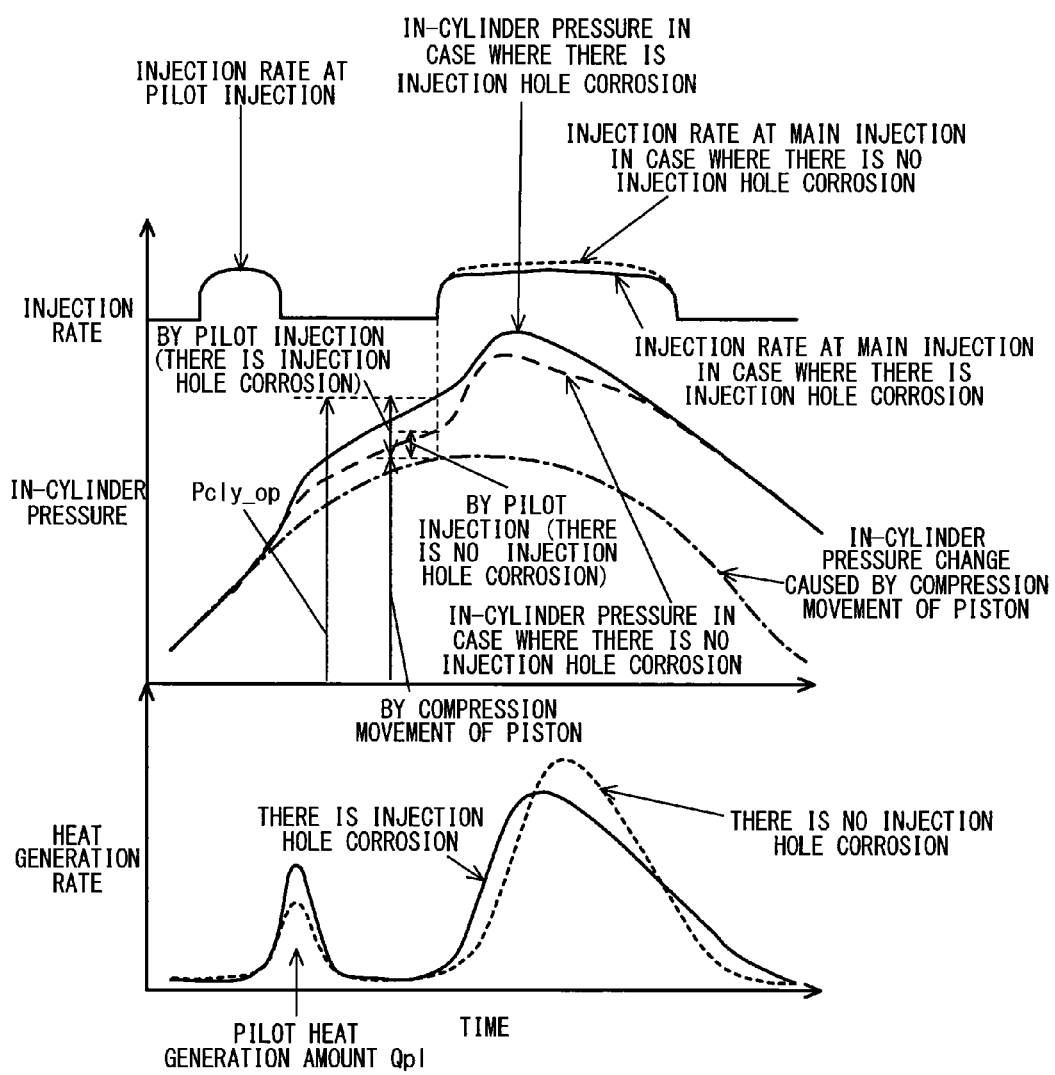
FIG. 21 is an example of a graph illustrating an in-cylinder pressure Pcly_op at the time of opening the valve in performing the main injection in comparison between the presence and the absence of the injection hole corrosion.

Instead of the in-cylinder pressure P(θ) illustrated in FIG. 4, the in-cylinder pressure Pcly_op calculated and estimated in the above manner is employed, and the calculation is performed in step S5 illustrated in FIG. 4, thereby calculating the pilot heat generation amount Qpl. Herein, the calculation of the pilot heat generation amount Qpl will be described with reference to FIG. 21 illustrating information about time changes in the heat generation rates caused by the pilot injection and the main injection superimposed on the information illustrated in FIG. 21. Referring to FIG. 21, the in-cylinder pressure Pcly_op at the time of main injection can be divided into a pressure increase amount due to the compression movement of the piston and a pressure increase amount due to the pilot injection. In FIG. 21, attention is paid to the pressure increase amount due to the pilot injection, and the injection increase range of the pilot injection amount in the case where there is the injection hole corrosion is large as compared with the pilot injection amount in the case where there is no injection hole corrosion. This is because the pilot heat generation amount Qpl differs depending on the presence or absence of the injection hole corrosion as indicated by the change in the heat generation rate illustrated in FIG. 21. The reason why the pilot heat generation amount Qpl differs is because the presence of the injection hole corrosion enlarges the diameter of the nozzle hole outlet end to weaken the spray penetration, which burns the fuel in the vicinity of the center of the cylinder (combustion chamber). That is, when there is the injection hole corrosion, the heat generation amount due to the pilot injection increases, so the increase in the pilot heat generation amount Qpl changes the in-cylinder pressure, which reflects the value of the in-cylinder pressure Pcly_op. Therefore, the in-cylinder pressure Pcly_op at the time of main injection is obtained, the obtained in-cylinder pressure Pcly_op is compared with the in-cylinder pressure Pcly_op in the case of the absence of the injection hole corrosion in step S5, thereby estimating the pilot heat generation amount Qpl. Thereafter, by performing the step S6 and the next processing, it is possible to determine the presence or absence of the injection hole corrosion.

(Fifth Embodiment)

Figure 22:
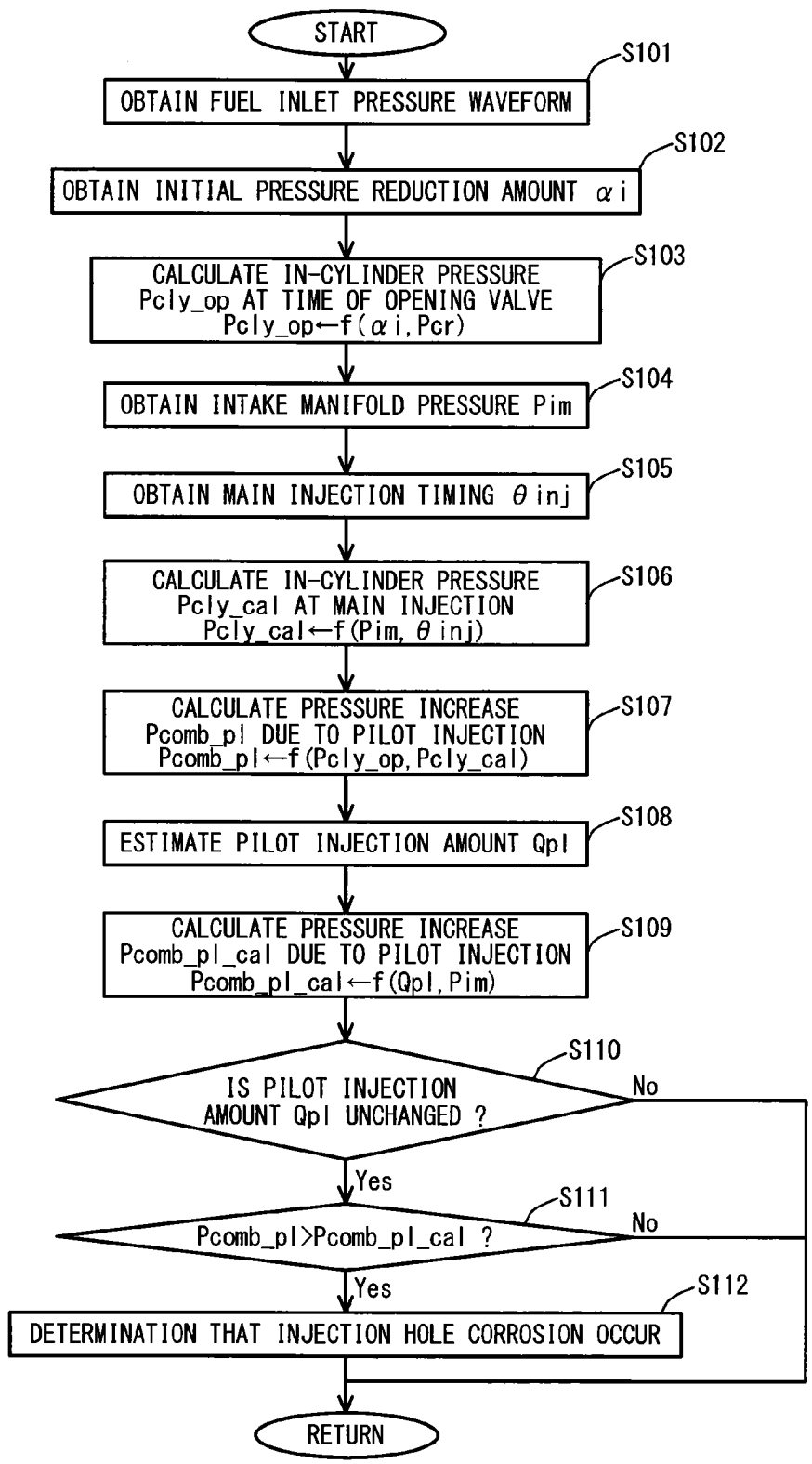
FIG. 22 is a flowchart illustrating an example of control for the fuel injection device according to a fifth embodiment.
Figure 23:
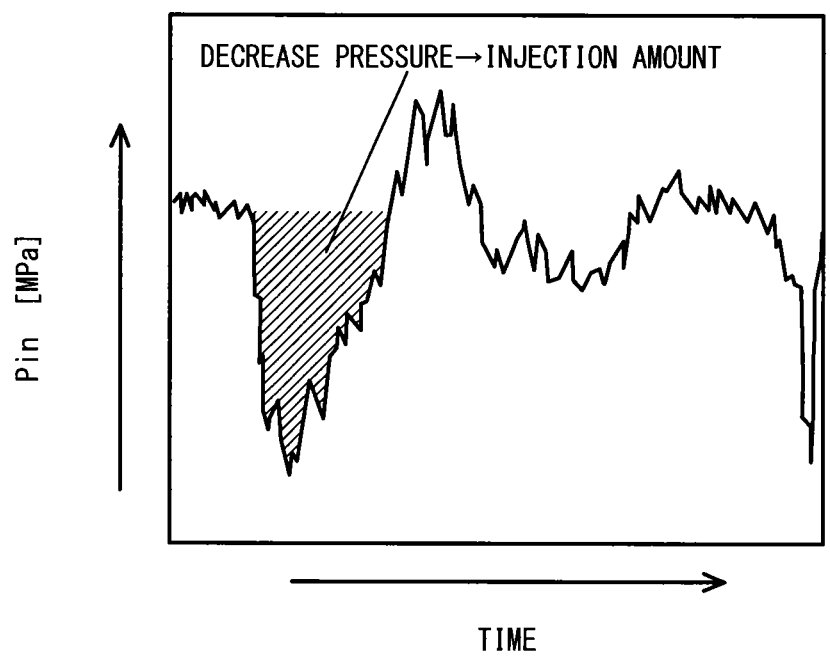
FIG. 23 is a graph illustrating a change in a fuel pressure depending on the fuel injection.

Next, the fifth embodiment will be described with reference to FIG. 22 and FIG. 23. The fifth embodiment is provided with the fuel injection device 201 which is the same as the third embodiment and the fourth embodiment. The fifth embodiment differs from the third embodiment and the fourth embodiment in the determination process of the presence or absence of the injection hole corrosion.

First, in step S101, the fuel inlet pressure waveform is obtained by the pressure gauge 117. Then, in step S102, the initial pressure reduction amount αi is obtained like the fourth embodiment. Then, in step S103, the in-cylinder pressure Pcly_op at the time of opening the valve at the main injection is calculated like step S57 in the flowchart illustrated in FIG. 18. Here, the in-cylinder pressure Pcly_op includes the pressure increase amount caused by the pilot combustion.

Then, in step S104, the intake manifold pressure Pim is obtained by the intake pressure sensor 118. Further, in step S105, the timing of the main injection, that is, the main injection timing θinj is obtained. Then, in step S106, the in-cylinder pressure Pcly_cal at the time of main injection is calculated based on the intake manifold pressure Pim obtained in step S104 and the main injection timing θinj obtained in step S105. Here, the in-cylinder pressure Pcly_cal is calculated as a value not considering the pressure increase amount due to the pilot injection.

Further, in step S107, on the basis of the in-cylinder pressure Pcly_op at the time of opening the valve obtained in step S103 and the basis of the in-cylinder pressure Pcly_cal at the time of main injection calculated in step S106, the pressure increase Pcomb_pl due to the pilot injection is calculated. That is, on the basis of the in-cylinder pressure Pcly_op calculated based on the fuel inlet pressure waveform reflecting the pressure increase due to the pilot injection and the basis of the in-cylinder pressure Pcly_cal calculated without considering the pressure increase due to the pilot injection, and the pressure increase due to the pilot injection Pcomb_pl is calculated.

In step S108, the pilot injection amount Qpl is estimated. The pilot injection amount Qpl, as indicated by hatching in FIG. 23, is grasped as a decrease amount of the fuel inlet pressure obtained by the pressure gauge 117.

In step S109, on the basis of the pilot injection amount Qpl obtained in step S108 and the basis of the intake manifold pressure Pim obtained in step S104, the pressure increase Pcomb_pl_cal due to the pilot injection is calculated. That is, the pressure increase Pcomb_pl_cal is calculated as a mathematical theoretical value when the pilot injection amount Qpl is ignited and burned on the state where the injection hole corrosion does not occur. The pilot injection amount Qpl used for calculation of step S109 means the reference fuel injection amount. Also, since the in-cylinder pressure correlates the heat generation amount, the pressure increase Pcomb_pl_cal means the reference heat generation amount.

Then, in step S110, it is checked whether or not the pilot injection amount Qpl is unchanged. Specifically, it is checked whether or not the difference is not observed as compared with the pilot injection amount Qpl prestored as a pilot injection amount in the state where there is no injection hole corrosion. When No is determined in step S110, the processing returns. When Yes is determined in step S110, the process proceeds to step S111. In step S111, it is checked whether or not the pressure increase Pcomb_pl calculated in step S107 becomes greater than the pressure increase Pcomb_pl_cal calculated in step S109. When Yes is determined in step S111, the processing proceeds to step S112, and it is determined that the injection hole corrosion occurs. That is, when the difference in the fuel injection amount is not recognized, and when the actually measured pressure increase Pcomb_pl becomes great, it is determined that the injector abnormality occurs, more specifically, that the injection hole corrosion occurs. Nevertheless the fuel injection amount is the same, the pressure increases, that is, the heat generation amount increases. This is because this phenomenon is peculiar when the injection hole corrosion occurs.

As described above, also in the fifth embodiment, it is possible to suitably determine whether or not the abnormality occurs in the injector 107 and to suitably determine whether or not the injection hole corrosion occurs in the injector 107.

In the case where the pressure increase Pcomb_pl differs from the pressure increase Pcom_bpl_cal, it is possible to determine that the pilot combustion abnormality occurs. Thus, the comparison between the pressure increase Pcomb_pl and the pressure increase Pcomb_pl_cal can be used for estimating the pilot combustion state.

While the exemplary embodiments of the present invention have been illustrated in detail, the present invention is not limited to the above-mentioned embodiments, and other embodiments, variations and modifications may be made without departing from the scope of the present invention.

[DESCRIPTION OF LETTERS OR NUMERALS]

| | |
|---|---|
| 1 fuel injection system | 100 engine |
| 101 engine body | 102 intake manifold |
| 103 exhaust manifold | 104 intake pipe |
| 105 exhaust pipe | 107 injector |
| 111 ECU | 115 in-cylinder pressure sensor |
| 116 crank angle sensor | 117 pressure gauge |
| 120 needle lift sensor | |

The invention claimed is:

1. A fuel injection device comprising:
an injector that injects fuel into a cylinder of an engine;
a fuel injection amount obtaining unit that obtains a fuel injection amount of fuel injected by the injector;
a heat generation amount obtaining unit that obtains a heat generation amount of the fuel injected by the injector and ignited; and
a control unit that determines that an injector abnormality occurs, when determining that the fuel injection amount obtained by the fuel injection amount obtaining unit and a reference fuel injection amount is substantially equal and that the heat generation amount obtained by the heat generation amount obtaining unit is greater than a reference heat generation amount corresponding to the reference fuel injection amount.

2. The fuel injection device of claim 1, wherein the fuel injection amount is a fuel injection amount of pilot injection and the heat generation amount is a heat generation amount of the pilot injection.

3. The fuel injection device of claim 1, wherein the heat generation amount is a heating amount, of a single-shot fuel injection performed in a fuel cut control.

4. The fuel injection device of claim 1, wherein the heat generation amount obtaining unit obtains a heat generation amount of ignited fuel based on an in-cylinder pressure.

5. The fuel injection device of claim 1, wherein the heat generation amount obtaining unit obtains a heat generation amount of ignited fuel based on a pressure change in fuel introduced to the injector.

6. The fuel injection device of claim 1, wherein the injector abnormality is corrosion of an injector hole of the injector.

7. The fuel injection device of claim 6, wherein when control unit that determines that an injector abnormality occurs, an injection time of the fuel injection amount obtained by the fuel injection amount obtaining unit is less than an injection time of the reference fuel injection amount.

\* \* \* \* \*